US009639889B2

(12) United States Patent
Babiarz et al.

(10) Patent No.: US 9,639,889 B2
(45) Date of Patent: May 2, 2017

(54) DISCOVERY ENGINE STOREFRONT

(71) Applicant: eBay Inc., San Jose, CA (US)

(72) Inventors: Jessie Babiarz, San Francisco, CA (US); David Anthony Basilio, Phoenix, AZ (US); Adam Jacobson, San Jose, CA (US); Matthew Losch, San Francisco, CA (US); Gregory Robinson, Quakertown, PA (US); Li Chen, San Jose, CA (US); Corey Demarco, Sunnyvale, CA (US); Exaud Hugho, Wilkes-Barre, PA (US); Michael Toma, West Wyoming, PA (US)

(73) Assignee: eBay Inc., San Jose, CA (US)

( * ) Notice: Subject to any disclaimer, the term of this patent is extended or adjusted under 35 U.S.C. 154(b) by 208 days.

(21) Appl. No.: 14/139,749

(22) Filed: Dec. 23, 2013

(65) Prior Publication Data

US 2015/0178822 A1    Jun. 25, 2015

(51) Int. Cl.
*G06Q 30/02* (2012.01)
*G06Q 30/06* (2012.01)
*G06Q 30/00* (2012.01)

(52) U.S. Cl.
CPC ........ *G06Q 30/0643* (2013.01); *G06Q 30/00* (2013.01)

(58) Field of Classification Search
CPC ............. G06Q 30/00; G06Q 30/0643; G06Q 30/0269; G06Q 30/0261
USPC ................................. 705/26.1, 27.1
See application file for complete search history.

(56) References Cited

U.S. PATENT DOCUMENTS

| 8,345,835 | B1 * | 1/2013 | Or-Bach | G06Q 30/0269 379/114.13 |
| 2008/0192027 | A1 * | 8/2008 | Morrison | G06Q 30/02 345/177 |
| 2008/0250464 | A1 * | 10/2008 | Masucci et al. | 725/82 |
| 2010/0250336 | A1 * | 9/2010 | Selinger et al. | 705/10 |
| 2012/0054032 | A1 * | 3/2012 | Kolodziej | 705/14.58 |
| 2012/0150686 | A1 * | 6/2012 | Aldomar et al. | 705/26.41 |

(Continued)

FOREIGN PATENT DOCUMENTS

NL    WO 0060509    * 10/2000 ............. G06Q 30/06

OTHER PUBLICATIONS

A. Noulas, S. Scellato, N. Lathia and C. Mascolo, "A Random Walk around the City: New Venue Recommendation in Location-Based Social Networks," 2012 International Conference on Privacy, Security, Risk and Trust and 2012 International Confernece on Social Computing, Amsterdam, 2012, pp. 144-153. doi: 10.1109/SocialCom-PASSAT.2012.70.*

*Primary Examiner* — M. Thein
*Assistant Examiner* — Michelle T Kringen
(74) *Attorney, Agent, or Firm* — Schwegman Lundberg & Woessner, P.A.

(57) ABSTRACT

A method and a system of online shopping using a digital storefront. For example, a digital storefront having multiple touchscreen display surfaces presents a plurality of tiles to a user, where one or more tiles display images of items for sale and at least one hunch question which may be related to the environment. In further examples, a response is received from the user to one or more hunch questions, and items are recommended for the user and presented to the user in one or more updated tiles on a touchscreen display surface.

31 Claims, 25 Drawing Sheets

(56) References Cited

U.S. PATENT DOCUMENTS

| | | | |
|---|---|---|---|
| 2012/0209657 A1* | 8/2012 | Connolly | G06Q 30/06 705/7.29 |
| 2012/0252418 A1* | 10/2012 | Kandekar et al. | 455/414.1 |
| 2014/0013319 A1* | 1/2014 | Hehir | G06F 8/61 717/176 |
| 2015/0058142 A1* | 2/2015 | Lenahan | G06Q 30/0631 705/16 |

* cited by examiner

2000

```
START
  ↓
RECEIVING AN AUTOMATIC CHECK-IN, FROM A BEACON ENABLED USER DEVICE,
BASED ON GEOGRAPHICAL PROXIMITY OF A USER DEVICE WITHIN A
COMMUNICATION'S ZONE OF THE DIGITAL STOREFRONT HAVING A BEACON DEVICE.
2001
  ↓
RECEIVING AN AUTOMATIC CHECK-OUT, FROM A BEACON ENABLED USER DEVICE,
BASED ON GEOGRAPHICAL PROXIMITY OF THE USER DEVICE WITHIN THE
COMMUNICATION'S ZONE OF THE DIGITAL STOREFRONT HAVING A BEACON DEVICE.
2002
  ↓
END
```

*FIG. 20*

DISCOVERY ENGINE STOREFRONT

TECHNICAL FIELD

The present application relates generally to the technical field of e-commerce and, in one specific example, to shopping online using a digital storefront.

BACKGROUND

The concept "Store of the Future" involves multiple shopping channels seamlessly integrating online and offline sales channels that create personal, relevant experiences for customers. Retailers are now focused on the total customer experience across all selling environments. The various shopping channels available today include physical stores, websites, online catalogues, social media, mobile apps, POS & payment systems, digital screens, short range communications (such as NFC and BLE), touch screens and tablets. As consumers have more technology and power at their fingertips than ever before, smart retailers are integrating digital technology to create an environment that will completely immerse the shopper and give them a seamless experience between both offline and online sales channels and across multiple devices.

Today, retail shopping environments can be extended beyond shopping malls to the airports, subway stations, train stations, and other transit system stations, or other locations where people are waiting, congregating or milling about by providing a digital storefront.

BRIEF DESCRIPTION OF THE DRAWINGS

Some embodiments are illustrated by way of example and not limitation in the figures of the accompanying drawings in which:

FIG. 20 illustrates a flow chart of a method of online shopping using a digital storefront and a user device to check-in and check-out, according to example embodiments.

DETAILED DESCRIPTION

Example methods and systems to shop online using a digital storefront are described. In the following description, for purposes of explanation, numerous specific details are set forth in order to provide a thorough understanding of example embodiments. It will be evident, however, to one skilled in the art that the present invention may be practiced without these specific details.

According to various exemplary embodiments, a seamless multiscreen, multi-device, in-store (or out-of-store) commerce experience may be provided. For example, multiple digital storefronts may be provided within an environment such as airports, subway stations, train stations, other mass transit system stations, physical stores, shopping malls or other retail shopping establishments, hotels, casinos, business and convention centers, sports and entertainment stadiums and venues, theme parks, museums, zoos, aquariums, or other locations suitable for one or more digital storefronts for online shopping. The digital storefront includes multiple display surfaces to allow multiple shoppers to each access one of the display surfaces or sides. Each of these display surfaces or sides may be a single touchscreen (e.g., made from a single sheet of glass or a large monitor) or may include one or more interactive touchscreens interconnected to provide an integrated surface or side for presenting items for sale to a user. Each of the sides or surfaces of the digital storefront may be viewed as a single interaction surface, side or window with multiple tiles, some or all of which may be live tiles. Each of the tiled interactive touchscreen surfaces, sides or windows are configured to provide a single online shopping session for users with dynamically changing context, personalized for users. The content recommended and presented to a user through the dynamically changing tiles is based on a responses by a user to hunch questions presented to the user, location-based user information, account information that is accessible when a user checks-in to a storefront shopping application and/or has a user device within a communications range of a beacon. Furthermore, a single online shopping session may be transferred, at any time, from a digital storefront to a user device, such as a mobile phone.

Example System Environment

Figure 1:
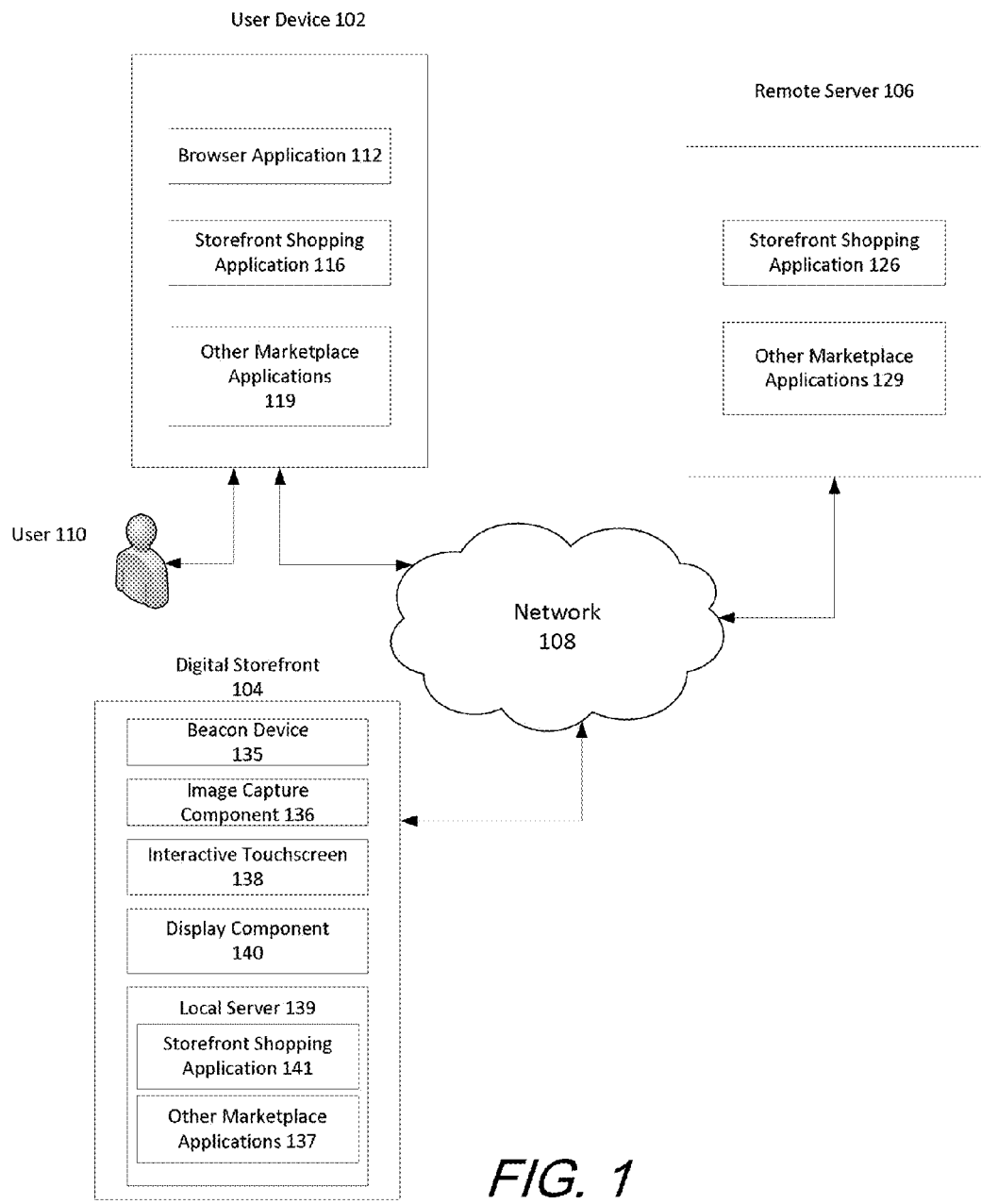
FIG. 1 is a diagram illustrating an example environment of a system for providing online shopping using a digital storefront.

With reference to FIG. 1, a diagram illustrating an example environment 100 in which embodiments of a system for providing online shopping using a digital storefront may be implemented is shown. The environment 100 includes a user device 102, a digital storefront 104 having a local server 139, and a remote server 106 in communication over a network 108. A user 110 may be communicating with a local server 139 residing within digital storefront 104, or remote server 106 over network 108 using user device 102.

Network 108, in one embodiment, may be implemented as a single network or a combination of multiple networks. For example, in various embodiments, network 108 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

For example embodiments, user device 102 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™. User device 102, in various embodiments, may be implemented using any appropriate combination of hardware and/or software configured for wired and/or wireless communication over network 108. For example, user device 102 may be implemented as a wireless telephone (e.g., smart phone), tablet, personal digital assistant (PDA), notebook computer, and/or various other generally known types of wired and/or wireless mobile devices. In additional embodiments, user device 102 may be Bluetooth™ low energy (BLE) communications protocol enabled device or enabled for other wireless short range communications protocols. User device 102 may be referred to as a beacon enabled user device in various embodiments.

For example embodiments, user device 102 may be used for checking-in and/or checking-out (or logging-out) of a shopping session with digital storefront 104, viewing and purchasing items transferred from a digital storefront 104 shopping session, checkout for processing payment of shopping cart items in a digital storefront shopping cart, and providing location-based user information within an environment, such as an airport. Further, content may be displayed by particular applications or "apps" stored in a memory of user device 102 and executed by one or more processors executing in user device 102. One example of an application is a browser application 112 that displays content, such as a web page or a user interface using a browser that may be used to access various marketplace applications (e.g. storefront shopping applications 116 and 126) having one or more components residing on user device 102, remote server 106 and/or local server 139. The storefront shopping applications and other marketplace applications shown in FIG. 1 may include mobile apps downloaded and residing on user device 102 that enables user 110 to access content through the downloaded marketplace apps, such as storefront shopping application 141 and other marketplace applications 137.

It is possible that users 110 may not wish to complete the checkout process on digital storefront 104, which is public, since they will have to enter personalized information into digital storefront 104. Accordingly, in some embodiments, users 110 are able to shop on a display surface of digital storefront 104 to add items to their shopping cart, and then transfer the shopping session to user device 102 (which may be a mobile phone) to complete the checkout for payment processing. In other words, a public screen may be utilized for the front end of the purchase process to browse and select items for purchase, whereas a private screen (e.g., a screen of user device 102 such as a smart phone) may be utilized for the backend of the purchase process (e.g., checkout for payment processing). Since digital storefronts may be located in an environment accessible 24 hours a day, users may shop from digital storefronts at any time. For alternative embodiments, user 110 who is checked-in to a storefront shopping application may transfer a shopping session from digital storefront 104 to user device 102 at any time during the shopping session.

For example embodiments, digital storefront 104 includes a combination of hardware and software capable of communication over network 108 for executing storefront shopping applications and other marketplace applications using a local server 139 in conjunction with user device 102 and remote server 106. For various embodiments, remote server 106, located within a cloud environment (not shown), may provide software as a service to digital storefront 104 and/or user device 102 where storefront shopping application 126 and other marketplace applications 129 run on remote server 106. The digital storefront 104 and/or user device 102 access the software applications through a client device (such as local server 139 or user device 102), while cloud providers manage the infrastructure and platforms that run the software applications.

For alternative embodiments, digital storefront 104 includes a local server 139, for executing storefront shopping application 141 and other marketplace applications 137 locally rather than accessing the remote server 106 through network 108 to run the storefront shopping application and other marketplace applications remotely. For example embodiments, local server 139 may provide a back-up service to remote server 106 when the internet is down or other network related interruptions occur. For alternative embodiments, the applications are served to digital storefront 104 primarily by local server 139 and one or more servers and databases within a cloud environment are accessed to update content and perform commit transactions.

Exemplary embodiments of digital storefront 104 may include an imaging capture component 136 capable of facial recognition when user 110 is near digital storefront 104 or within the field of view of the imaging capture component 136. The image capture component may be a depth camera, such as Kinect, PrimeSense, or Reach, that is capable of detecting movements in front of a screen or touchscreen display surface. Imaging capture component 136 can be used to help digital storefront 104 detect users 110 that interact with touchscreen 138 or may capture information about users 110. For example, how many users pass by digital storefront 104, how long do users stand in front or hover in front of digital storefront 104, physical characteristics of users, etc. that may be useful to digital storefront 104 merchants and/or operators.

Exemplary embodiments of the digital storefront 104 include an interactive touchscreen 138. The interactive touchscreen 138 and has multiple touchscreen display surfaces (or sides) such that a user may browse and shop from each of the sides or surfaces. The touchscreen displays includes one or more visual tiles that present content to user 110, such as images of items, hunch questions and other information. One or more of the tiles may dynamically change the content presented to user 110 and may be referred to as "live" tiles. The interactive touchscreen 138 may be implemented in a number of different ways. For example, interactive touchscreen display 138 may be a capacitive touchscreen embedded in a monitor; an infrared (IR) frame touch screen applied to a window (or large sheet of glass) or monitor; a capacitive touch film applied to a window (or large glass sheet) provided by vendors such as Displax or Visual Planet; laser touch sensor technology for detecting movements in front of a screen or window (or large glass sheet); or other displays that allow user 110 to interact with digital storefront 104 thru a touchscreen.

Other exemplary embodiments of the digital storefront 104 include a display component 140. The display component may be a life-size or larger display in various embodiments. Content is displayed by display component 140 on the interactive touchscreen 138. For one embodiment, one or more projectors are used to project content onto a translucent film on a large sheet of glass. In other embodiments, large monitors may be used. In other example embodiments, more than one monitor or display may be combined to create an appearance of a single large interactive touchscreen with visual tiles and may be implemented using a number of display or monitor technologies. The content to be displayed on the interactive touchscreen 138 is generated by one or more applications served by one or more local and/or remote servers. The interactive touchscreen 130 and display component 140 may provide a virtual input for user 110 to browse and shop for products/services, select products/services for purchase, checkout for payment processing, transfer a shopping session from digital storefront 104 to user device 102, save a shopping session for later access on the same or different user device 102, select delivery options and check-in and/or check-out (log-out) of the digital storefront 104 through a number of applications.

In various embodiments, the digital storefront 104 includes a beacon device 135 or other wireless near range communication device for enabling location-based check-in and check-out from the digital storefront 104, location-based payment processing, transferring a shopping session from the digital storefront 104 to user device 102 based on a location-based check-in, and track location-based information of a user within an environment in which the digital storefront is located. For alternative embodiments, non-location based options may be used to check-in and/or check-out user 110, transfer a shopping session from digital storefront 104 to user device 102, and to process payment for online items desired to be purchased.

The user device 102 may be enabled to communicate with beacon device 135 using BLE communications protocol when user device 102 is within the communication zone of beacon device 135 in example embodiments, and in alternative embodiments other near range communication devices may be used. User device 102, which is capable of communicating with beacon devices 135, may be referred to as a beacon enabled user device 102. In further embodiments, beacon device 135 may refer to any type of wireless geo-location or location tracking device using Bluetooth™ LE or other communications protocols, that can be used for location tracking within the environment, such as an airport.

The beacon device 135 may be a small sensor placed inside a physical space (for example, digital storefront 104) that transmits and receives data to and from beacon enabled user devices 102. Beacon device 135 may take on a variety of form factors. The discovery, handshaking and communications with beacon device 135 may be handled by user device 102 in example embodiments. This information provided by beacon device 135 can be used to identify the location of user device 102, and to connect user device 102 to a service or to content provided by servers (or other computing devices), located locally in digital storefront 104 or remotely in a cloud computing environment. The beacon device 135 may transmit one or more sequences of information to user device 102 to provide proximity information, as well as some content and instructions to user device 102 to perform an action, such as display check-in or check-out request, transfer a shopping session from digital storefront 104 to user device 102, process payment to purchase items in a shopping cart in digital storefront 104 or user device 102, etc. In other words, a enabled enabled user device 102 may receive personalized location based notifications and actions while within the communications range of one or more beacon devices 135 within an environment (e.g., an airport). By way of example, beacon device 135 may be an iBeacon available from Apple Inc. of Cupertino, Calif. or a PayPal beacon available from eBay Inc. of San Jose, Calif.

Remote server 106, according to some embodiments, may be a server that hosts one or more marketplace applications that may provide a number of marketplace functions and services to user 110. Remote server 106 may include at least a storefront shopping application 126, which may be configured to provide online shopping for user 110 with digital storefront 104 and other marketplace applications; configured to prompt a user to check-in or check-out or automatically performing check-in or check-out of a shopping session on digital storefront 104 and/or user device 102; configured to process beacon related location information; configured to process payment of items to be purchased from digital storefront 104; configured to transfer a shopping session from digital storefront 104 to user device 102 to continue the shopping session and/or purchase items; and configured to track location-based user information within an environment.

Remote server 106, according to some embodiments, may be maintained by a service that processes check-ins and check-outs so that a proprietor of a location, such as a merchant or multiple merchants, or others know user 110, is at the location, such as a location near digital storefront 104. Remote server 106 may also be configured to provide access to one or more merchant's products and services (collectively referred to as "items") that are for purchase on digital storefront 104, and may provide a payment service processing to purchase items.

Remote server 106 may also include an account database (not shown) that includes account information for users having an account on remote server 106, such as user 110. In some embodiments, check-in application 128 may check user 110 and user device 102 into a location based on information in user's account information from account database. Account information may include information about user 110 that may be sent to the location or merchant(s) when user 110 is checked-in to that location, such digital storefront 104 location, based on preferences of user 110 or opting in or out of such features. For example, when user 110 checks-in to a location, information may retrieved about user 110 to provide to the digital storefront 104 online merchant(s) or operators of the digital storefront 104, such as an identity of user 110 stored in account information 122 and a frequency or most recent check-in activity of user 110 at the digital storefront 104 location or nearby locations. Additional information of user 110 from account information 122 may also be provided to the digital storefront 104 online merchant(s) or operators of digital storefront 104, upon a successful check-in by user 110. The additional information may include preferences and favorite items of user 110 at the location or other locations, past purchases made by user 110 at the location or nearby locations. The additional information may include known measurements or sizes worn by user 110. In some embodiments, account information may also include some financial information related to user 110, such as how much user 110 has spent at similar locations, how much funds user 110 has in their account associated with remote server 106, and credit information of user 110 to determine creditworthiness of user 110. Further information may also be shared with digital storefront 104 online merchant(s), operators or other service providers, upon a check-in. In some embodiments, user 110 may be able to determine and select what information may be shared with the digital storefront 104 online merchant(s), operators or other service providers, upon a check-in.

Remote server 106 also maintains a plurality of user accounts in the account database (not shown), each of which may include account information associated with individual users 110. For example, account information may include private financial information of users 110 of user devices 102 such as account numbers, credentials, passwords, device identifiers, user names, phone numbers, credit card information, bank information, or other financial information which may be used to facilitate online transactions by user 110. Account information may also include information such as items that user 110 wants, items that user 110 owns, items that user 110 has previously purchased, a location of user 110, past item searches that user 110 has performed, and any themes that user 110 has indicated they would like to find more items related to. Account information further includes data about user 110 with micro-location tracking within an environment such as an airport, train station, subway station, or other transit system station.

According to various exemplary embodiments, other devices such as lights, speakers, robotics, mechanize clothes racks, etc. may be connected to digital storefront 104 and as the user interacts (or engages) with digital storefront 104 in a shopping session with the digital storefront 104, user 110 may control the attached devices. For example, the digital storefront 104 (or user device 102) may display menus and controls for controlling the aforementioned devices.

According to various exemplary embodiments, a wireless access point may be setup inside digital storefront 104. The aforementioned wireless access point may be similar to other wireless access points that enable various devices (e.g., mobile devices such as tablets and smart phones) to connect to a network such as the Internet, although in this case the wireless access point is specifically tied to a particular digital storefront. For example, when the user approaches digital storefront 104 with their user device 102, the user device 102 may automatically attempt to connect to the wireless access point associated with digital storefront 104. In some embodiments, this may cause an authentication prompt to be displayed in a webpage of a web browser of user device 102, or via push notification (e.g., text message) displayed on user device 102, requesting the user to authenticate themselves by clicking on an "agree" button, for example. Accordingly, this authentication method may be utilized to leverage a shopping experience, so that no further interaction to establish a connection between user 110 and digital storefront 104 is necessary. In other words, by connecting to the wireless access point and launching the authentication screen, a session may immediately be initiated between the user device 102 and digital storefront 104 (or remote or local server associated with digital storefront 104). Thereafter, WebSocket technology may be utilized to transfer data back and forth between digital storefront 104 and user device 102. Accordingly, user 110 may initiate a communication session between user device 102 and digital storefront 104 in a variety of ways to have a seamless shopping experience between a digital storefront and user device.

Example Airport Environment

Figure 2:
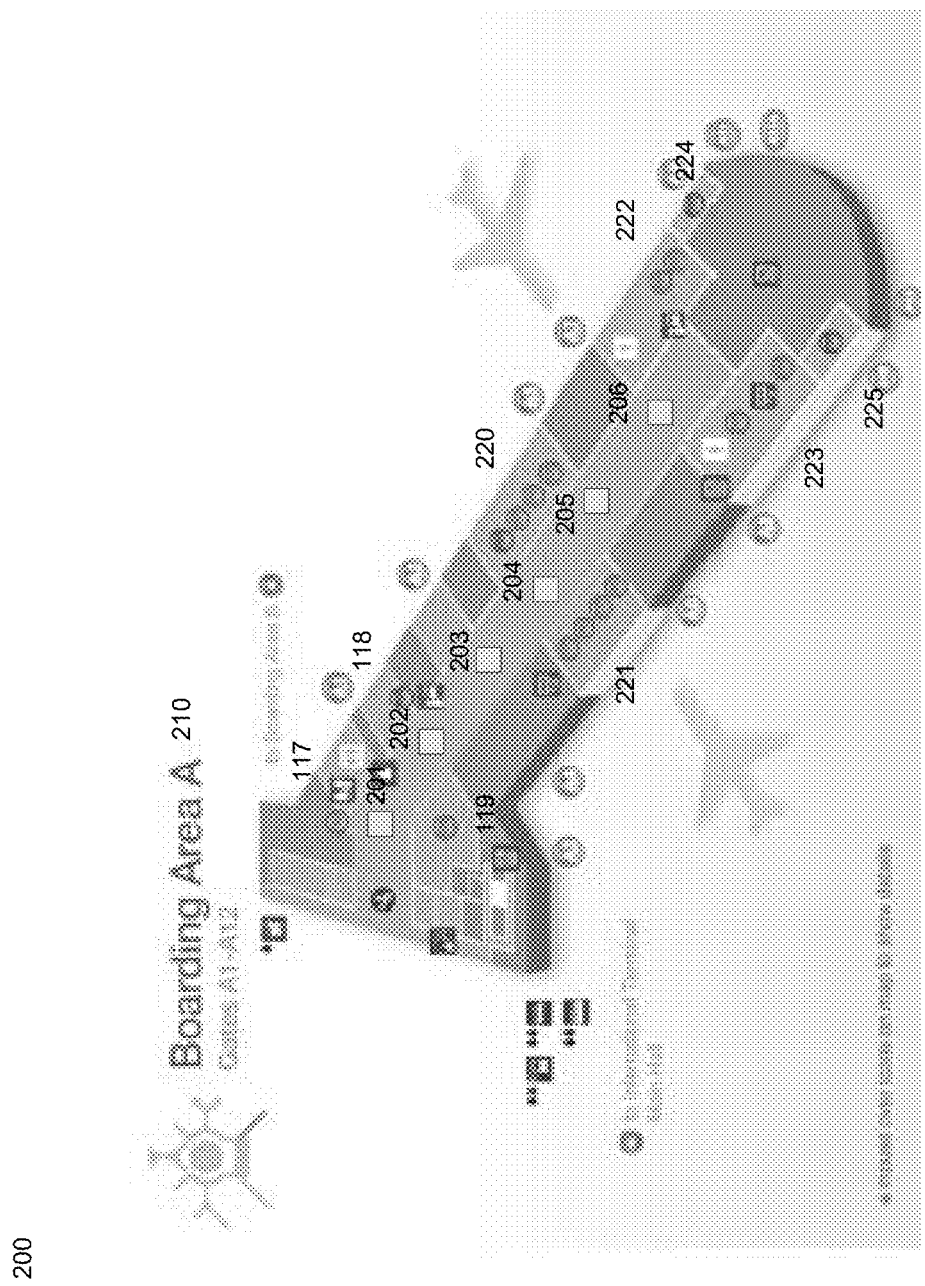
FIG. 2 illustrates an airport environment having multiple digital storefronts, according to an example embodiment.

FIG. 2 illustrates an airport environment 200 with terminal A or boarding area A 210, according to an example embodiment. Boarding area A 210 includes multiple digital storefronts 201-206 spaced along the shopping and restaurant areas 117-225. Various vendors located within terminal A include merchant stores and the restaurants shown by the dots located within areas 117-125, according to an example embodiment. The digital storefronts 201-206 are spaced to provide convenient online shopping for customers for products and services from various vendors who are digital storefront merchants or sellers, including vendors located within the airport environment 200, or other airport environments where the planes may depart or arrive. The digital storefronts 201-206, which have beacon devices, may be positioned within the airport environment 200 such that travelers within the environment 200 are within a communication's zone or range of one or more beacon devices such that location-based user information (e.g., user location and user purchase history) may be tracked within airport environment 200. In addition to having beacon devices located within the digital storefronts 201-206, other beacon devices may be placed at other locations within the airport environment 200, such as shops, restaurants and kiosks in airport environment 200.

The digital storefront may provide a seamless shopping experience for users in boarding area A 210 between online shopping and in-store shopping for travelers. Travelers may browse and shop at physical stores located within the airport environment 200 and may browse and shop at the digital storefronts 201-206. The travelers have the option to check-in using a user device 102, such as a mobile phone. Travelers, who are within the range of a digital storefront having a beacon device, may be invited to check-in to a storefront shopping application 116 on their user device 102, or at one of the digital storefronts 201-206 using its interactive touch-screen 138. As described above, travelers who are checked-in may have location-based user information tracked and monitored as they visit stores and restaurants within the communications zone of beacon devices 135 located within or nearby the digital storefronts 201-206, or at other locations within the airport environment 200. In some embodiments, user 110 may check-in to a storefront shopping application 116 and 126, using a web browser or mobile app installed on user device 102, and when user device 102 is within a communications zone of one or more beacon devices 135 within the environment, user 102 may have his/her location tracked within the environment. The display component 140 of the digital storefronts 201-206 presents content such as hunch questions and product/service recommendations using the traveler's information, such as location-based user information, in addition to account information associated with checking-in to a storefront shopping application within the airport environment 200 and responses from user 110 to one or more hunch questions.

The account information for traveler's checked-in to storefront shopping application includes profile and payment information. This information is available to storefront shopping application and may be used to present a personalized shopping experience to travelers who decides to shop at one of the online digital storefronts 201-206. By accessing the traveler's location-based user information, account information, and responses to hunch questions, the digital storefronts 201-206 may present content thru the dynamic tiles, such as additional hunch questions and product/service recommendations personalized for the user 110, who is a traveler in this example.

Furthermore, the travelers shopping online at one of the digital storefronts 201-206 may transfer a shopping session, including any items in the digital storefront shopping cart, at any time during the shopping session, from the digital storefront to the traveler's user device 102 to continue shopping from the traveler's user device 102, or to a physical store located within shopping environment 200. Additionally, the traveler may purchase items in the digital storefront shopping cart, using his/her user device 102 to maintain his/her privacy while completing his/her purchase, or alternatively decide to complete the purchase at one of the stores or restaurants physically located within airport environment 200. Furthermore, during the checkout payment process, the traveler has the option to select a delivery service, for example, in store pick-up at the arrival or departure airport environment, or a valet service that personally delivers the items at the arrival airport environment or personally delivers the items to the travel's hotel at his/or travel destination.

Example Portable Electronic Device Beacon Device

Figure 3:
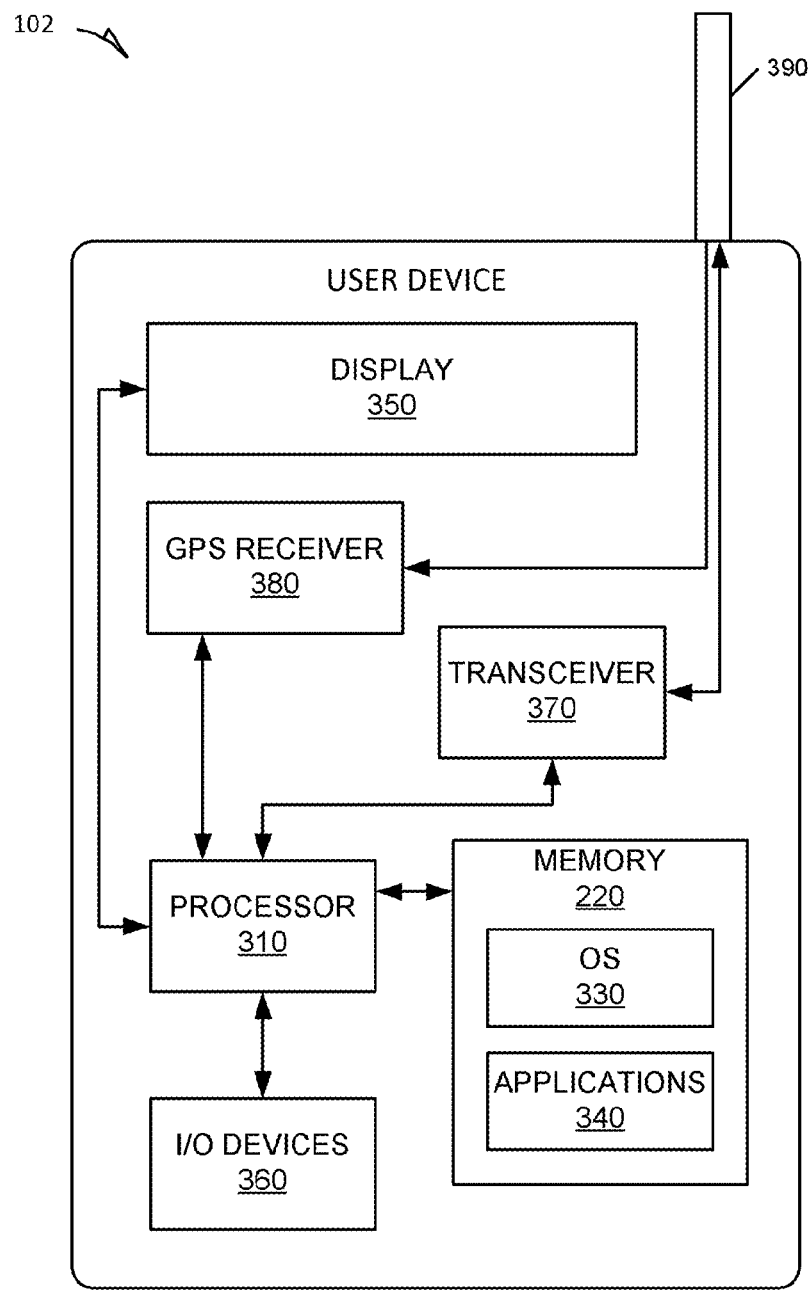
FIG. 3 is a block diagram illustrating a user device, according to an example embodiment.

FIG. 3 is a block diagram illustrating a user device 102, according to an example embodiment. In some embodiments, user device 102 may be a mobile device such as a smartphone, and in alternative embodiments, user device 102 may be a tablet computer, a personal computer, laptop computer, netbook, or tablet computer, set-top box, video game console, head-mounted display (HMD) or other wearable computing device. In example embodiments, user device 102 may be BLE enabled (or beacon enabled) or enabled for other short-range wireless communications protocols. The user device 102 may include a processor 310, which may be any of a variety of different types of commercially available processors suitable for mobile devices (for example, an XScale architecture microprocessor, a Microprocessor without Interlocked Pipeline Stages (MIPS) architecture processor, or another type of processor). For example embodiments, processor 310 may be implemented with one or more central processing units (CPUs), microcontrollers, graphics processing units (GPUs) and/or digital signal processors (DSPs).

A memory 320, such as a Random Access Memory (RAM), a Flash memory, or other type of memory, is typically accessible to processor 310. The memory 320 may be adapted to store an operating system (OS) 330, as well as application programs 340, such as browser application 112, storefront shopping application 116, and other marketplace applications 119 that provide additional features.

The processor 310 may be coupled, either directly or via appropriate intermediary hardware, to a display 350 and to one or more input/output (I/O) devices 360, such as a keypad, a touch panel sensor, a microphone and the like.

User device 102 may also include I/O devices 360, allowing for user 110 of user device 102 to input information into user device 102. Such information may include check-in and/or check-out information, product selection information, shopping session transfer information, and payment information, for example, as an amount required to complete a transaction, account information, authentication information such as a credential, or identification information.

Additionally, the user device 102 may include a camera module (not shown) for acquiring and processing images. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the user device 102. In this manner, a connection between user device 102 with network 170 may be established. Further, in some configurations, a GPS receiver 380 may also make use of the antenna 390 to receive GPS signals. For a BLE enabled user device 102, transceiver 370 is configured to receive and send data packets from BLE devices, such as beacon devices.

Figure 4:
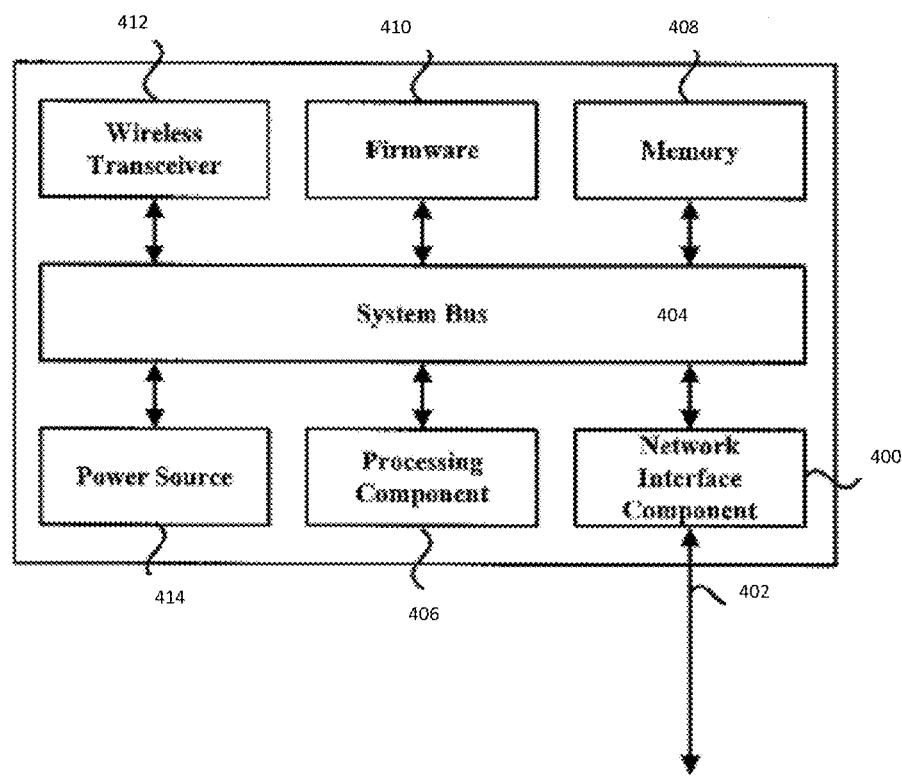
FIG. 4 is a diagram illustrating a beacon device, according to various embodiments.

FIG. 4 is a diagram illustrating a beacon device 135, according to various embodiments. As shown in FIG. 4, beacon device 135 includes a network interface component (NIC) 400 configured for communication with a network, such as network 108, shown in FIG. 1. For some embodiments, NIC 400 includes a wireless communication component, such as a wireless broadband component, a wireless satellite component, or various other types of wireless communication components including radio frequency (RF), microwave frequency (MWF), and/or infrared (IR) components configured for communication 402 with network 108. For other embodiments, NIC 400 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Beacon device 135 also includes a system bus 404 for interconnecting various components within beacon device 135 and communicating information between the various components. Such components include a processing component 406, which may be one or more processors, microcontrollers, graphics processing units (GPUs) or digital signal processors (DSPs), a memory component 408, firmware 410 and one or more wireless transceivers 412 that may each include an antenna that is separable or integral and is capable of transmitting and receiving information according to one or more wireless network protocols, such as Wi-Fi™, 3G, 4G, HDSPA, LTE, RF, NFC, IEEE 802.11a, b, g, n, ac, or ad, Bluetooth®, BLE, WiMAX, ZigBee®, etc. Beacon device 135 may also include a power source 314. Power source 314 may be any power source capable of providing sufficient current to power the components of beacon device 135. In some embodiments, power source 318 may be a battery, such as a watch battery or button cell.

In some embodiments, beacon device 135 may be configured to transmit information using wireless transceivers 412 based on instructions stored in memory 408 and/or firmware 410 executed by processing component 406. The instructions may be stored in memory 408 and/or firmware 410 by directly writing the instructions to memory 408 and/or firmware 410 over communication link 402 to beacon device hardware interface 400 or by wirelessly receiving instructions by wireless transceivers 412. In some embodiments, beacon device 135 may be configured to transmit information to a user device 102 related to checking-in to a digital storefront 104 where beacon device 135 is located. In some embodiments, the transmitted information may include a packet sequence received from remote server 106 that identifies a particular merchant and/or merchant location. The packet sequence may include packets having a small size, such as 32 bits, that may include information that may be used to identify the location of a digital storefront or physical store within an environment.

In some embodiments, beacon device 135 may also transmit instructions that when received by user device 102 may cause marketplace applications to be executed by processing component 406 to cause user device 102 to perform a check-in or check-out at a digital storefront, such as at digital storefronts 201-206 within airport environment 200. Further, beacon device 135 may transfer instructions that, when received by user device 102 may allow user 110 to authorize a payment to be processed by remote server 106. In some embodiments, wireless transceiver 412 may correspond to a BLE transceiver configured to transmit and receive information according to the BLE communications protocol. In some embodiments, beacon device 135 may be a BLE beacon device or dongle such as described in U.S. patent application Ser. No. 13/938,860, filed on Jul. 10, 2013, the entire contents of which are hereby incorporated by reference in their entirety. Further, BLE beacon 135 may have a design such as shown in U.S. Design application No. 29/455,720, filed May 23, 2013, the entire contents of which are also incorporated herein by reference in their entirety. Additionally, beacon 135 may implement a check-in method according to U.S. patent application Ser. No. 14/039,153, filed on Sep. 27, 2013, the entire contents of which are hereby incorporated by reference in their entirety.

Examples of Digital Storefront and User Device User Interfaces

Figure 5:
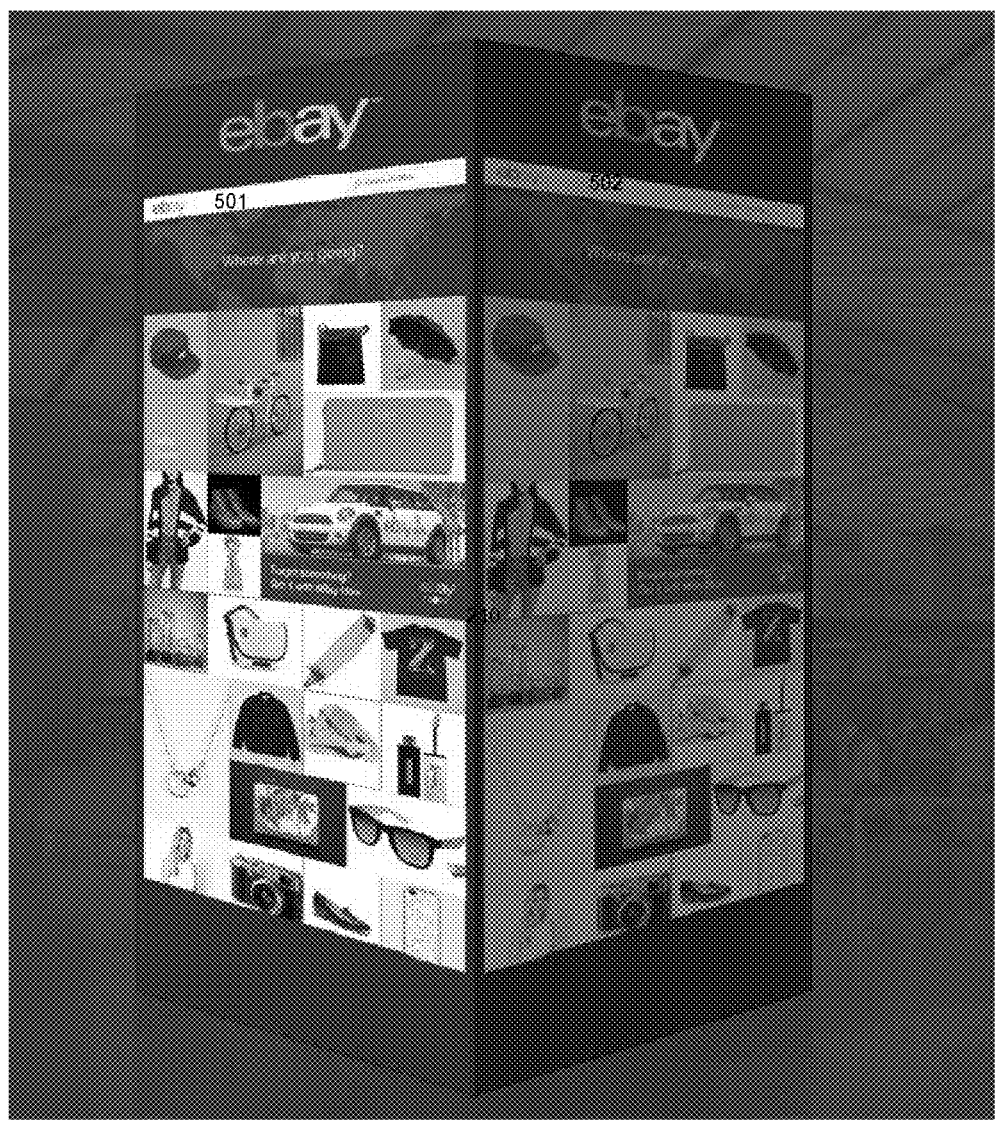
FIG. 5 illustrates a digital storefront 500, according to an example embodiment.

FIG. 5 illustrates a digital storefront 500 according to an example embodiment. As shown in FIG. 5, the digital storefront includes multiple display surfaces to allow multiple shoppers to each access one of the display surfaces. It should be appreciated that, in various embodiments, user 110 may be referred to as shopper, traveler, or customer without departing from the scope of the present application. Display surfaces 501 and 502 are shown in FIG. 5. There are four display surfaces shown in FIG. 5 such that four different shoppers may browse and purchase items using one of the display surfaces, which are interactive touchscreens, such as interactive touchscreen 138, shown in FIG. 1. The display surfaces present a plurality of tiles, in various dimensions, to shoppers, such as user 110 shown in FIG. 1. Although four display surfaces are shown in FIG. 5, the number of display surfaces may vary; the number, dimensions, layout and presentation of tiles may vary; and the overall shape, dimensions and size of the display surfaces may vary in alternative embodiments. One or more of the tiles may dynamically change or be referred to as "live" tiles as the storefront shopping application 126 residing on remote server 106, or storefront shopping application 141 residing on local server 139, dynamically changes the content of the live tiles. One or more of the tiles display an initial and/or follow-up hunch questions to a shopper and prompt the shopper for an answer. Hunch questions are questions presented to a user 110 to help discover a user's affinity for anything, from books to electronic gadgets to fashion or vacation spots. In various embodiments, hunch questions are generated by combining algorithmic machine learning and user-curated content to provide the user with personalized shopping recommendations. In some embodiments, the methods and systems to generate hunch questions are described in U.S. Pat. No. 7,966,282 issued on Jun. 21, 2011, the entire contents of which are hereby incorporated by reference in their entirety.

For example embodiments, the shopper may provide responses to the hunch questions via a virtual input on the display surface. The initial and/or follow-on hunch questions may be related to the environment and based on responses from shoppers, and may be further refined to be environment related or non-environment related. In further embodiments, hunch questions may be generated using location-based information once users 110 are checked-in to locations associated with beacon devices 135, and are within a communications range of such beacon devices 135. In yet other embodiments, hunch questions may be generated using account information from users who are checked into a digital storefront 104. In other embodiments, hunch questions may be generated by combining algorithmic machine learning and user created content/information such as hunch question responses, location-based user information, and user account information. For various embodiments, one or more of the digital storefronts 500 may provide online shopping within various environments, such as an airport, train stations, subway stations or other mass transit system stations. A digital storefront 500 may be located within a first environment and represent a starting travel destination of a shopper, and a final travel destination of the user may be located in a second environment, where items purchased (in the first environment) may be delivered to.

Figure 6:
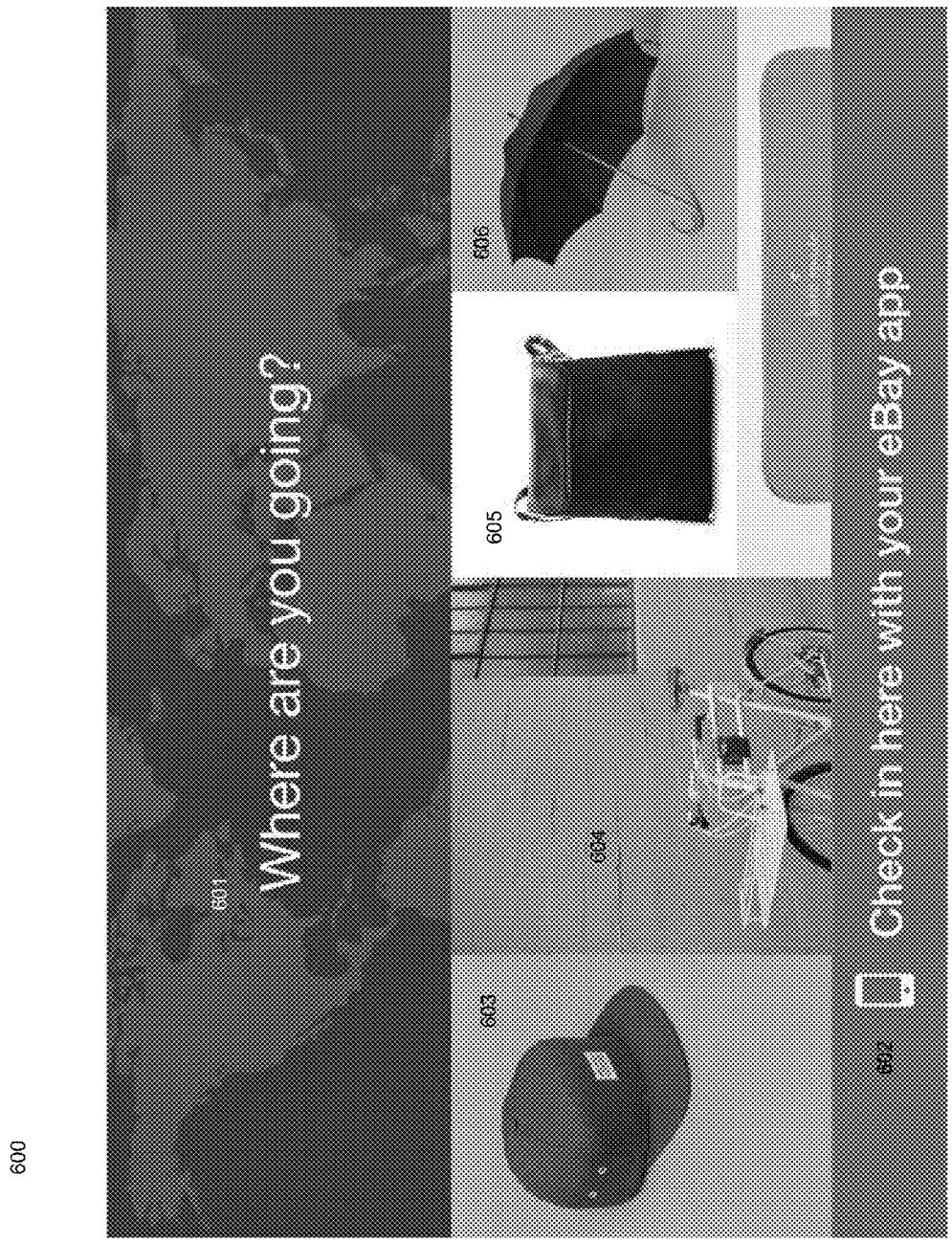
FIG. 6 illustrates a display surface of a digital storefront, according to an example embodiment.

FIG. 6 illustrates a display surface of a digital storefront, according to an example embodiment. The display surface 600 includes multiple tiles 601-606. For one embodiment, tile 601 displays a hunch question related to an environment, such as a travel environment, for example "Where are you going?" Tile 601 asks a shopper to check-in with a storefront shopping application or other marketplace application, such as eBay app, which is accessed by user device 102 thru storefront shopping application 116 or browser application 112. If the shopper checks-in to storefront shopping application or other marketplace applications, the digital storefront has access to various types of information about the user (e.g., account information, location-based user information) and may further personalize the shopping experience for the user by predicting, recommending and identifying products and/or services personalized for a shopper. Tiles 603-606 represent a variety of items that a traveler may be interested in browsing and purchasing. The display surface 600 is an interactive screen and may receive input from a shopper via a virtual keyboard or other I/O devices suitable for a touchscreen.

Figure 7:
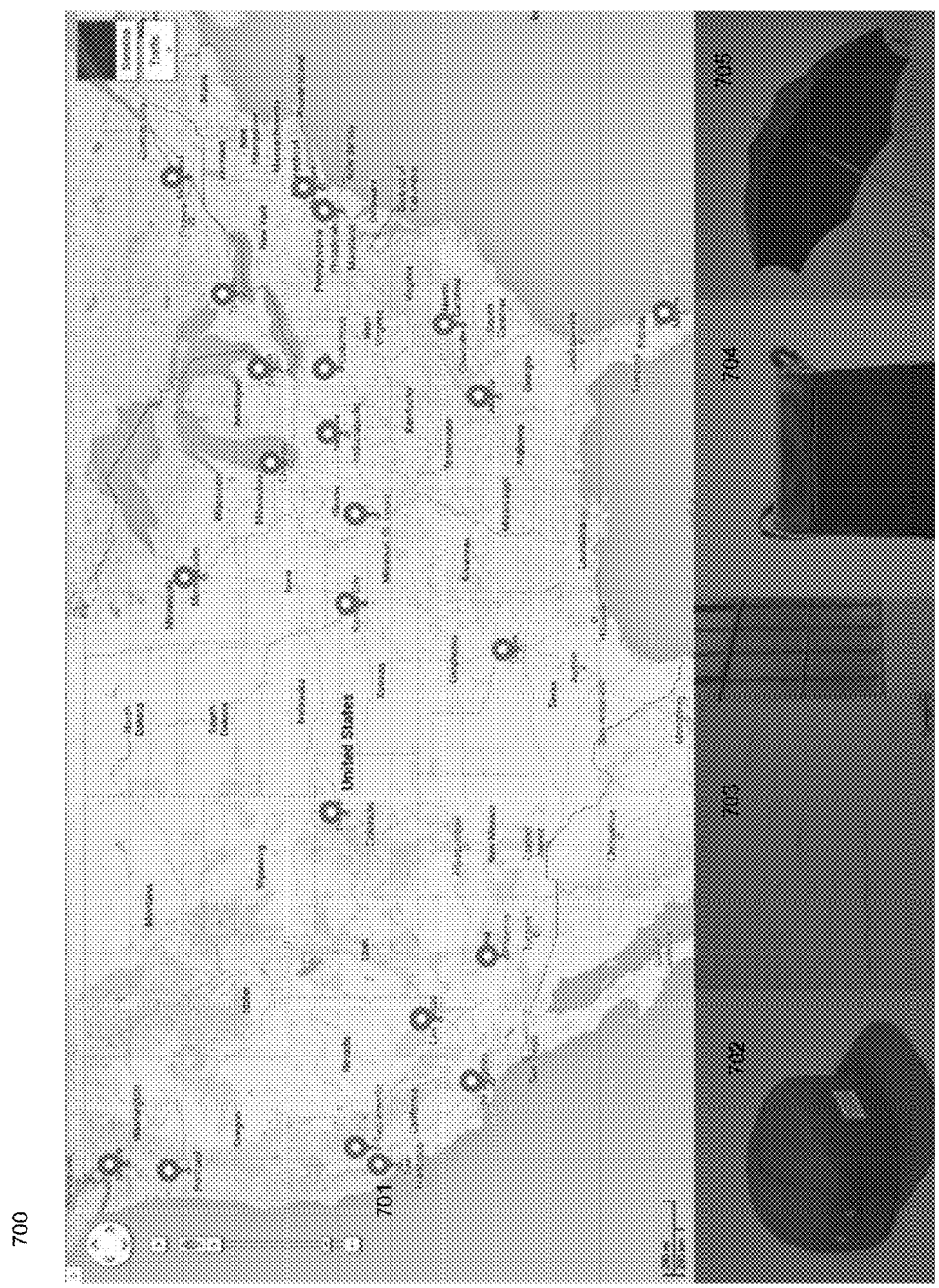
FIG. 7 illustrates a display surface of a digital storefront, according to another embodiment.

FIG. 7 illustrates a display surface of a digital storefront, according to another embodiment. The display surface 700 is an interactive screen displaying a map in tile 701 for the shopper to select a travel destination. The map in tile 701 is generated once a user touches a portion of tile 601 displaying the hunch question "Where are you going?" in FIG. 6. There are several cities displayed on the map with red location pins, which can be selected by having the user touch the pin for the desired location. Tiles 702-705 displays items, but are no longer accessible for browsing while tile 701 is active and waiting for a shopper's response.

Figure 8:
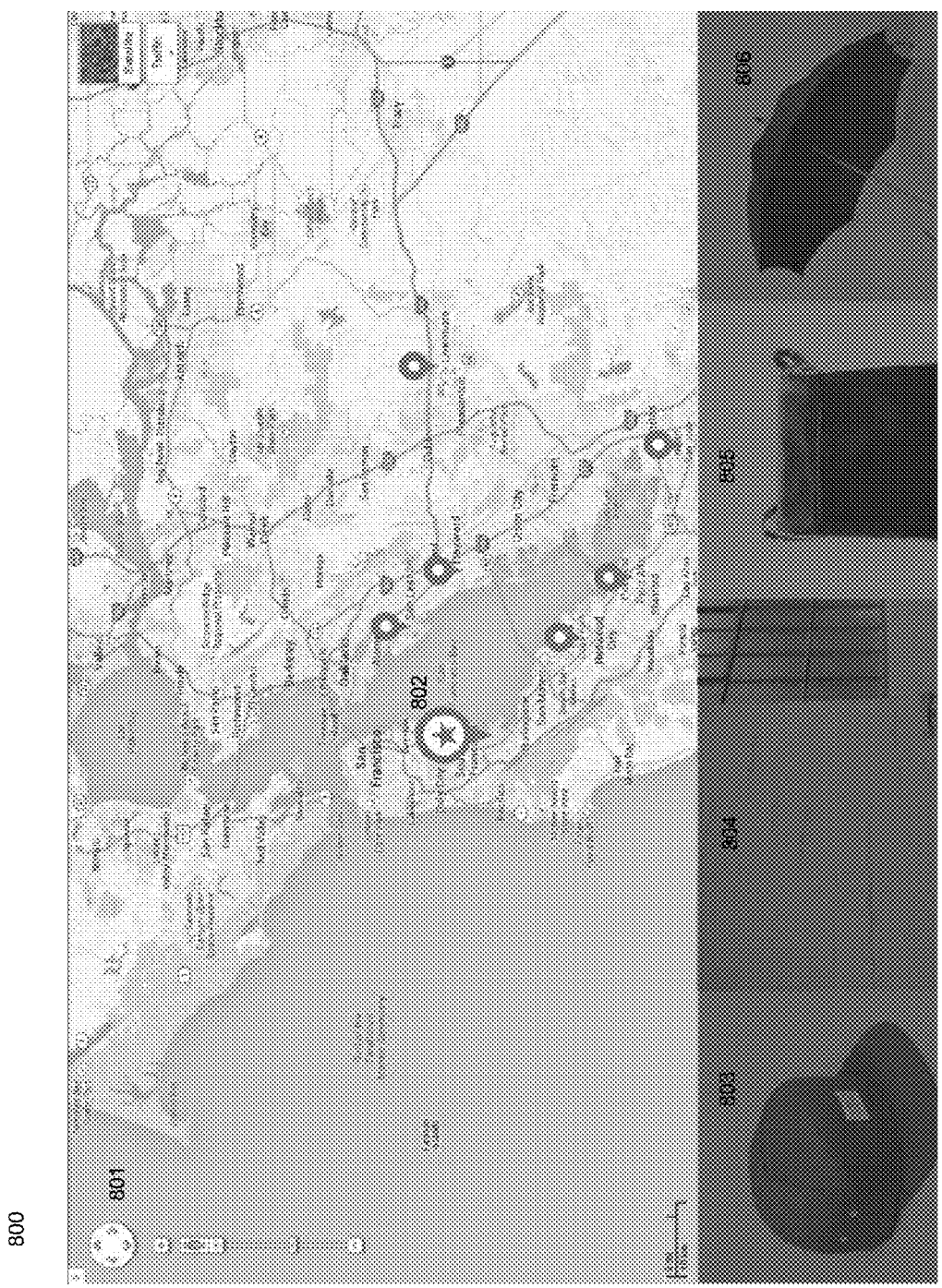
FIG. 8 illustrates a display surface of a digital storefront, according to another embodiment.

FIG. 8 illustrates a display surface of a digital storefront, according to another embodiment. The display surface 800 displays a map in tile 801 with San Francisco (SF) selected (by a user), as shown by the enlarged (or highlighted) red location pin with the start at 802. Tiles 803-806 displays items, but are no longer accessible for browsing.

Figure 9:
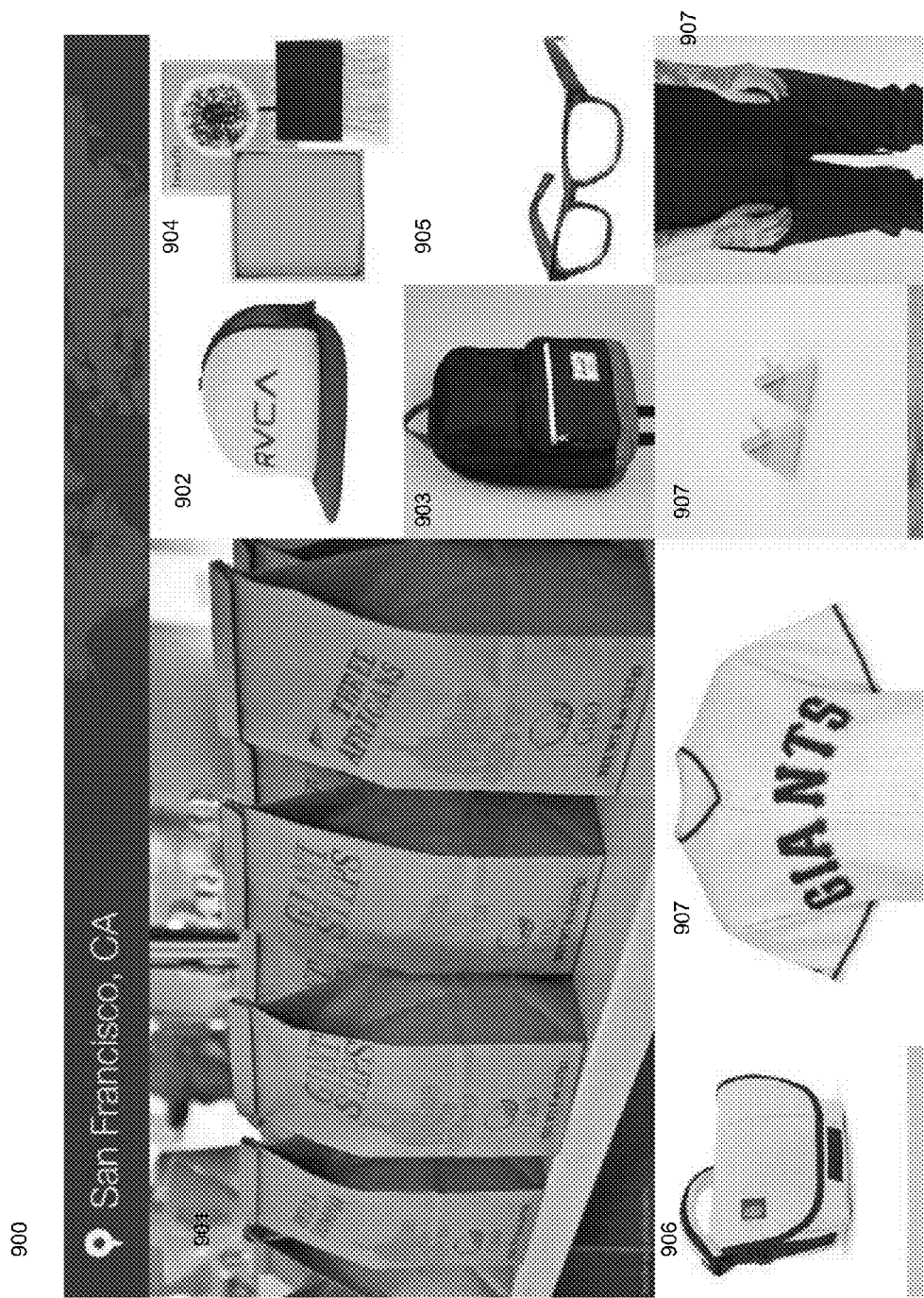
FIGS. 9 and 10 illustrate a display surface of a digital storefront with tiles updated with new content, according to example embodiments.
Figure 10:
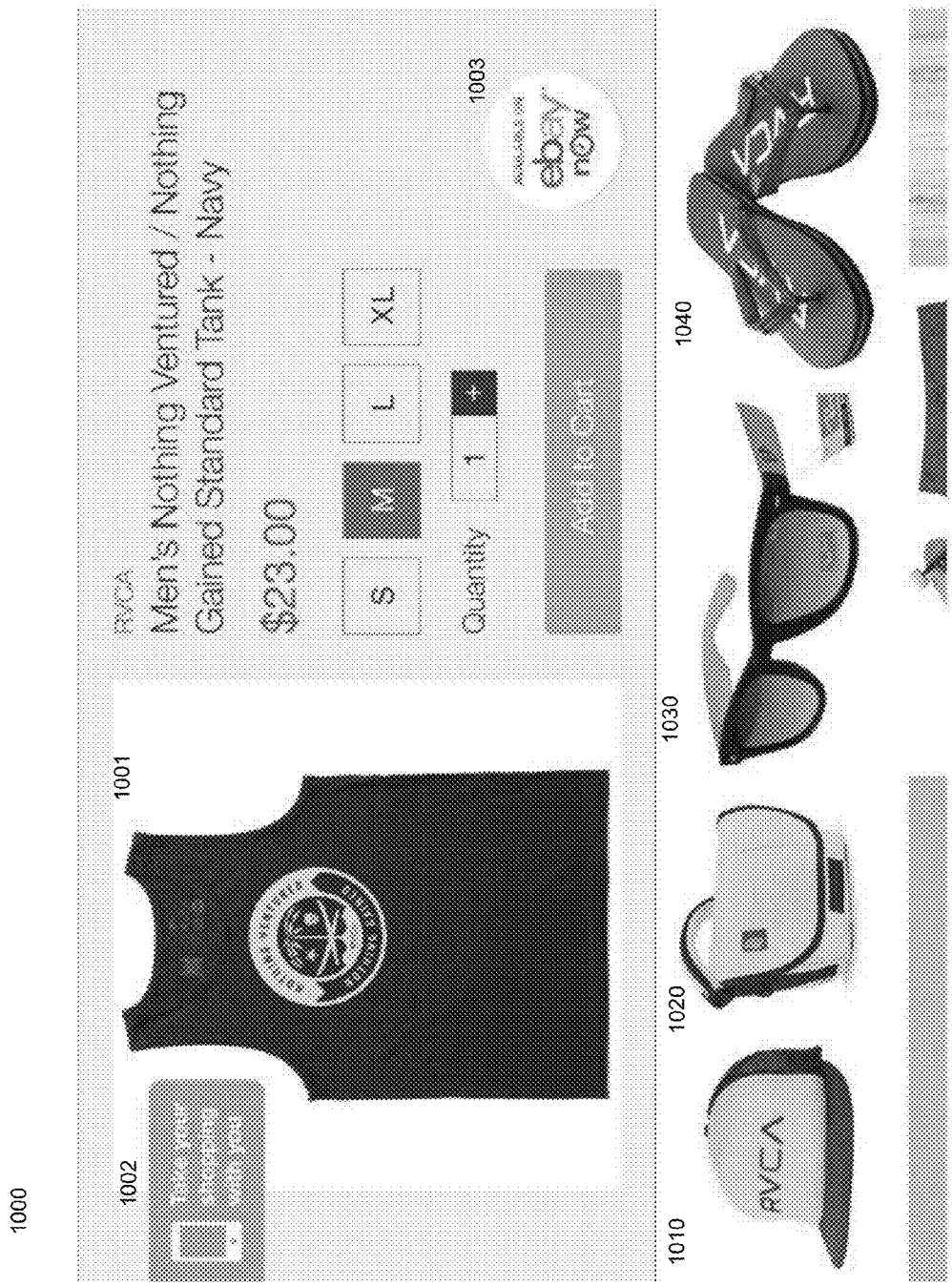

FIG. 9 illustrates a display surface of a digital storefront with tiles updated with new content, according to an example embodiment. The display surface 900 includes tiles 901-907, updated with content based on the user's response to the initial hunch question, "Where are you going?" The user selected San Francisco, as shown in by the map in tile 801 in FIG. 8. Tile 901-907 display items to the shopper relating to traveling and San Francisco. The shopper may touch or use various gestures that the display surface recognizes (e.g., panning, zooming, rotating, flicking, pressing and tapping, etc.) to browse through items having images displayed on the tiles. A tile may be selected by the user and upon user selection, may enlarge its view size and display a gallery or collection (including a curated collection) of items for sale or other links. For example, if the shopper selects tile 902 shown in FIG. 9, other items related to the San Francisco brand RVCA may be displayed as shown in tile 901 in FIG. 10. Tiles 1010 displays an image of an RVCA hat, tile 1020 displays an image of an RVCA bag, 1030 displays an image of an RVCA pair of sunglasses, and 1040 displays an image of an RVCA pair of slippers.

Tile 1001 displays an image of an RVCA shirt that has been selected by a shopper to view product information and to allow the shopper to add the RVCA shirt to his/her digital storefront shopping cart. Display element 1002 allows the shopper to transfer the shopping session to the shopper's user device 102. A shopper may desire to transfer the shopping session to his/her user device 102 to proceed with payment or to continue shopping on user device 102. Display element 1003 allows a user to select a delivery option, such as ebay now which will deliver the items within a specified period of time (e.g., same day) at a specified location, such as the traveler's arrival airport or hotel.

Figure 11:
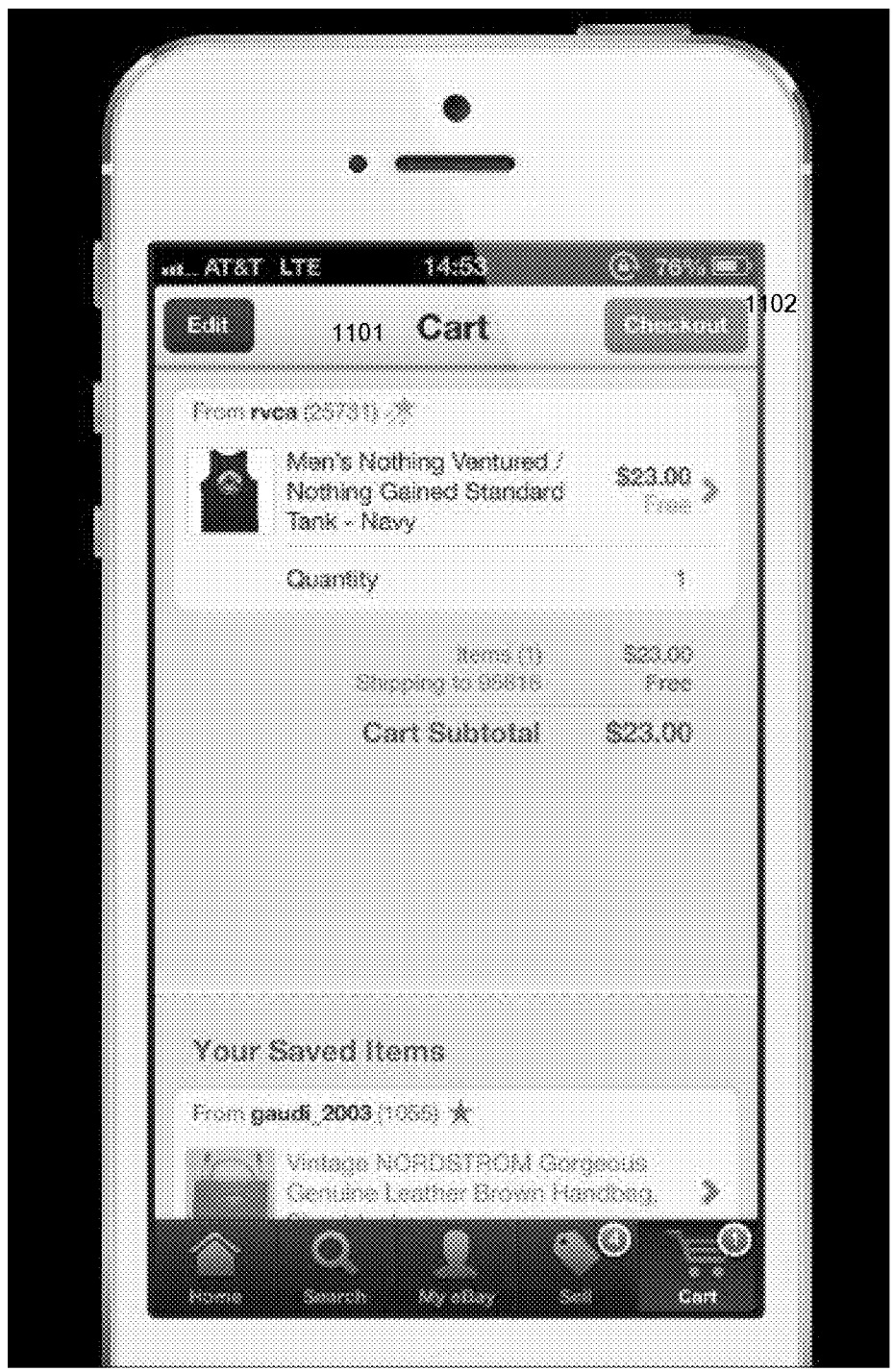
FIG. 11 illustrates a shopping session transferred from a digital storefront to a user device, according to an example embodiment.

For an example embodiment, a shopper selects user interface element 1002, which will then transfer the shopping session the shopper's user device 102, as shown in FIG. 11. The RVCA shirt, shown in Tile 1001 in FIG. 10 has been added to the shopper's cart 1101 displayed on the shopper's user device 102 in FIG. 11. The user device 102 has a user interface element 1102 for checkout for payment processing when the shopper is ready to purchase the items in his/her shopping cart 1101.

In an example embodiment, the transferred shopping session by user 110, which may occur anytime during the shopping session, from digital storefront 104 to user device 102, allows user 110 to continue user's current shopping session, even as user 110 is flying on an airplane having WiFi (or other wireless communications) available to its passengers to use with their mobile devices, such as user device 102. A user 110, may decide to save user's shopping session in a marketplace application (e.g., storefront shopping application), and continue user's shopping session at a later time, for example on the airplane. In further embodiments, airlines companies, may make various marketplace applications (e.g., storefront shopping application) available to passengers using mobile devices 102, free of charge or with a fee. In other embodiments, storefront shopping application may be integrated with other marketplace applications, such as eBay's marketplace, RedLaser, Milo, and other marketplace applications to incorporate additional shopping features. For example, by integrating a storefront shopping application with a RedLaser application, user 110 may view competitive prices at local retailers of products user 110 was searching for or browsing.

In additional embodiments, once a shopping cart from a shopping session is transferred to user device 102, digital storefront merchants, system administrators or other third parties, receives access to consumer data of user 110, which may provide insight into purchase behavior of user 110 and other consumers. Such data may be used to build look-a-like profiles of consumers and create custom-tailored advertising to user 110 to bring to user's attention similar product(s) that they placed in their shopping cart, but ended up not purchasing those items. These advertisements may be served within a marketplace application (e.g., storefront shopping application) or via push notifications.

Figure 12:
FIGS. 12 and 13 illustrate a user device displaying messages to check-in and shop on a digital storefront, according to example embodiments.
Figure 13:
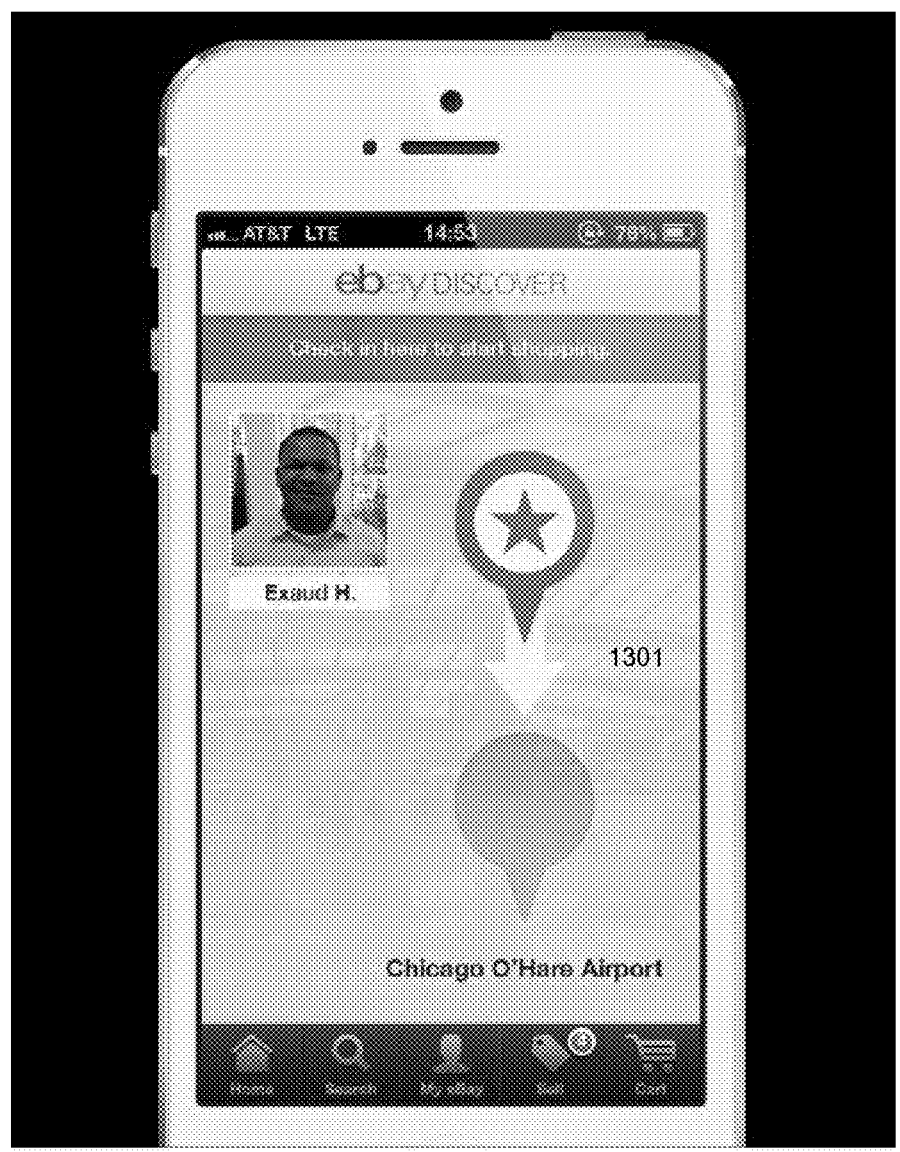

FIG. 12 and FIG. 13 illustrate embodiments of a user device 102 displaying notifications to the shopper related to checking-in and starting shopping at online digital storefront 104. The view 1200, shown in FIG. 12, of the user device 102 prompts the shopper that he/she is near a digital storefront 104 (also referred to as a kiosk) and to check-in. The view 1300, shown in FIG. 13, notifies the shopper to check-in at the Chicago O'hare airport, where a digital storefront is located. In further embodiments, digital storefront 104 may automatically check-in and/or check out a shopper using beacon device 135, or other near range communication device.

Checking-in to online digital storefront 104 may be done by checking-in to an application installed on user device 102 which would be running during a shopping session at digital storefront 104 or on user device 102 (if the shopping session is transferred over to user device 102) in example embodiments. In other embodiments, checking-in may be by proximity-based (or location-based check-in) once user 110 has been checked-in to a beacon location. Checking-out of the shopping session may be by prompting user 110 to check-out, no user activity within a specified period of time, logging out of a storefront shopping application, or proximity-based (or location-based check-out) once user 110 (previously checked-in to a beacon location) moves out of communications range of the beacon location.

Example Flow Charts

Figure 14:
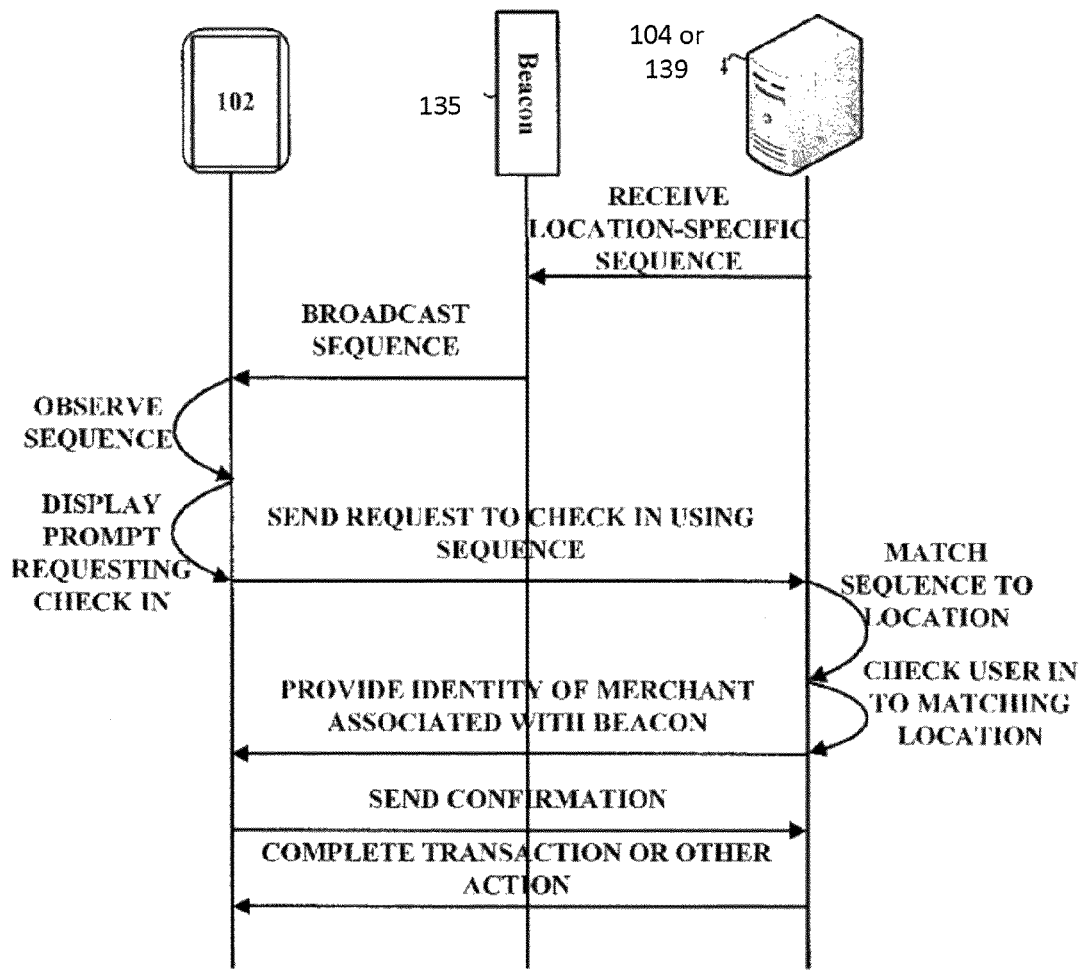
FIG. 14 is a diagram illustrating a flow of checking a user into a location using a specific sequence of packets, according to example embodiments.

FIG. 14 is a diagram illustrating a flow of checking a user into a location using a specific sequence of packets, according to example embodiments. As shown in FIG. 14, remote server 104 or local server 139 may send to beacon device 135 a specific sequence of packets that may be unique to a location where beacon device 135 is installed and may be used to identify the location. In some embodiments, the specific sequence of packets may have a small packet size, for example 32 bits, and the packets may include information that identify the location. Beacon device 135 may store the sequence in memory and broadcast the sequence when active. When user 110 having user device 102 arrives at the digital storefront location, or enters a merchant's store, restaurant, and the like, user device 102 may receive and observe the sequence broadcast by beacon device 135. User 110 may then be prompted to check-in. When user 110 responds to the check-in prompt, user device 102 may send a request to check-in to remote server 106 or local server 139 with the request including the received and observed packet sequence. Remote server 106 or local server 139 may then match the received sequence to a store sequence to determine the location and check user 110 into the matching location. In some embodiments, checking user 110 in to a digital storefront location may allow user 110 to pay for a transaction using a payment processing service such as may be provided by remote server 106 for items that user 110 wants to buy online at the digital storefront location (or location of user device 102 once a shopping session has been transferred), or to provide additional location-specific features as well as provide the digital storefront merchants and service providers with information about user 110.

Once remote server 106 or local server 139 has checked-in user 110 into the digital storefront location, remote server 106 or local server 139 may provide an identity of the digital storefront location associated with beacon device 135 for user 110 to review to ensure that they are checking-in to the desired digital storefront location or other location. User 110 may then send a confirmation to remote server 106 or local server 139. When remote server 106 or local server 139 receives the confirmation, any actions associated with the check-in may be completed. Such actions may include authorizing payments to merchant(s) associated with the digital storefront, with such payments being processed by remote server 106 or local server 139. In some embodiments, the flow shown in FIG. 15 may be repeated for each location having beacon devices 135 that transmit a specific and unique packet sequence such that user device 102 may be prompted to check-in to a digital storefront location which the location is identified based on the received packet sequence.

Figure 15:
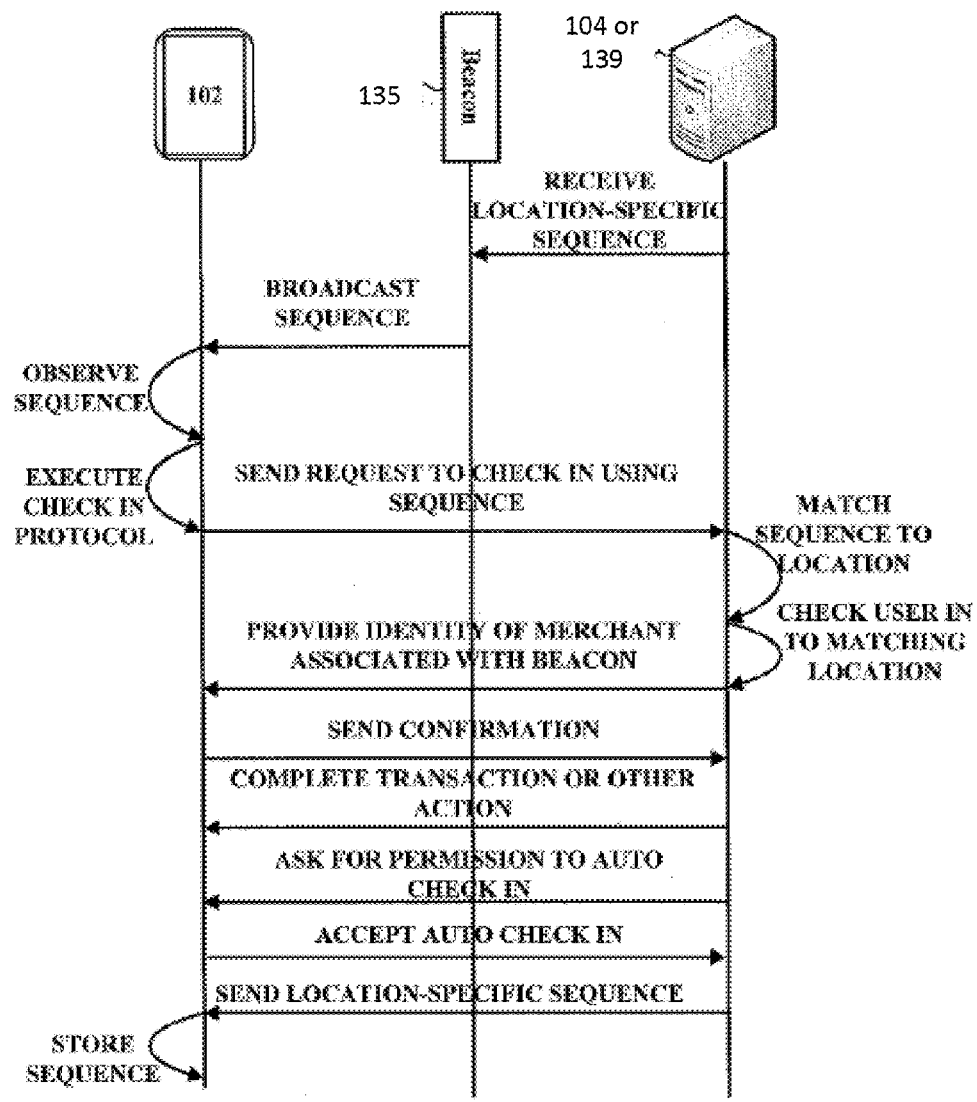
FIG. 15 is a diagram illustrating a flow of automatically checking a user into a location using a specific sequence of packets, according to example embodiments.

FIG. 15 is a diagram illustrating a flow of automatically checking a user into a location using a specific sequence of packets, according to example embodiments. As shown in FIG. 15, remote server 106 or local server 139 may send to beacon device 135 a specific sequence of packets that may be unique to a location where beacon device 135 is installed and may be used to identify the digital storefront location. In some embodiments, the specific sequence of packets may have a small packet size, for example 32 bits, and the packets may include information that identify the digital storefront location. Beacon device 135 may store the sequence in memory and broadcast the sequence when active. When user 110 having user device 102 arrives at the location of a digital storefront, or enters a merchant's store, restaurant, and the like, user device 102 may receive and observe the sequence broadcast by beacon device 135. User 110 may use user device 102 to execute a check-in protocol to check-in to the digital storefront location, and send a request to check-in to remote server 106 or local server 139 with the request including the received and observed packet sequence. Remote server 106 or local server 139 may then match the received sequence to a store sequence to determine the location and check user 110 into the matching location. In some embodiments, checking-in user 110 into the location may allow user 110 to pay for a transaction using a payment processing service such as may be provided by remote server 106 or local server 139 for items that user 110 wants to buy in the location, or to authorize a payment for items that user 110 has already agreed to purchase before entering the location. Moreover, checking-in to a digital storefront location may also provide user 110 with additional options specific to the location, such as previously described. Furthermore, checking-in in to the location may also provide the location with information about user 110, based on preferences of user 110.

Once remote server 106 or local server 139 has checked-in user 110 into the location, remote server 106 or local server 139 may provide an identity of digital storefront 104 associated with beacon device 135 for user 110 to review to ensure that they are checking-in to the desired digital storefront location. User 110 may then send a confirmation to remote server 106 or local server 139. When remote server 106 or local server 139 receives the confirmation, any actions associated with the check-in may be completed. Such actions may include authorizing payments to a merchant associated with a digital storefront location, with such payments being processed by remote server 106 or local server 139. Such actions may also include receiving offers, specials, coupons, and the like for use at the merchant or location at which beacon device 135 is installed or otherwise associated with. Remote server 106 or local server 139 may then send user device 102 a message requesting permission for automatically checking-in and/or checking-out user 110 whenever user 110 is at the digital storefront location (or entering or exiting the communications range of beacon 135 installed at digital storefront 104). When user 110 accepts or enrolls in an automatic check-in, remote server 106 or local server 139 may send the specific sequence of packets that correspond to the location to user device 102. User device 102 may then store the specific sequence of packets in any of memory. Consequently, the next time user 110 having user device 102 arrives at or enters the same location, when user device 102 receives the specific sequence of packets sent by beacon device 135, processing component 206 of user device 102 may match the received sequence to the specific sequence stored in any of memories and automatically execute a check-in protocol to send a check-in request to remote server 106 or local server 139 when the received sequence matches the stored sequence. In some embodiments, the flow shown in FIG. 15 may be repeated for each location having beacon devices 135 that transmit a specific and unique packet sequence such that any of memories of user device 102 may store a specific and unique sequence for each location enabling user 110 having user device 102 to automatically check-in to each location based on the received packet sequence.

Figure 16:
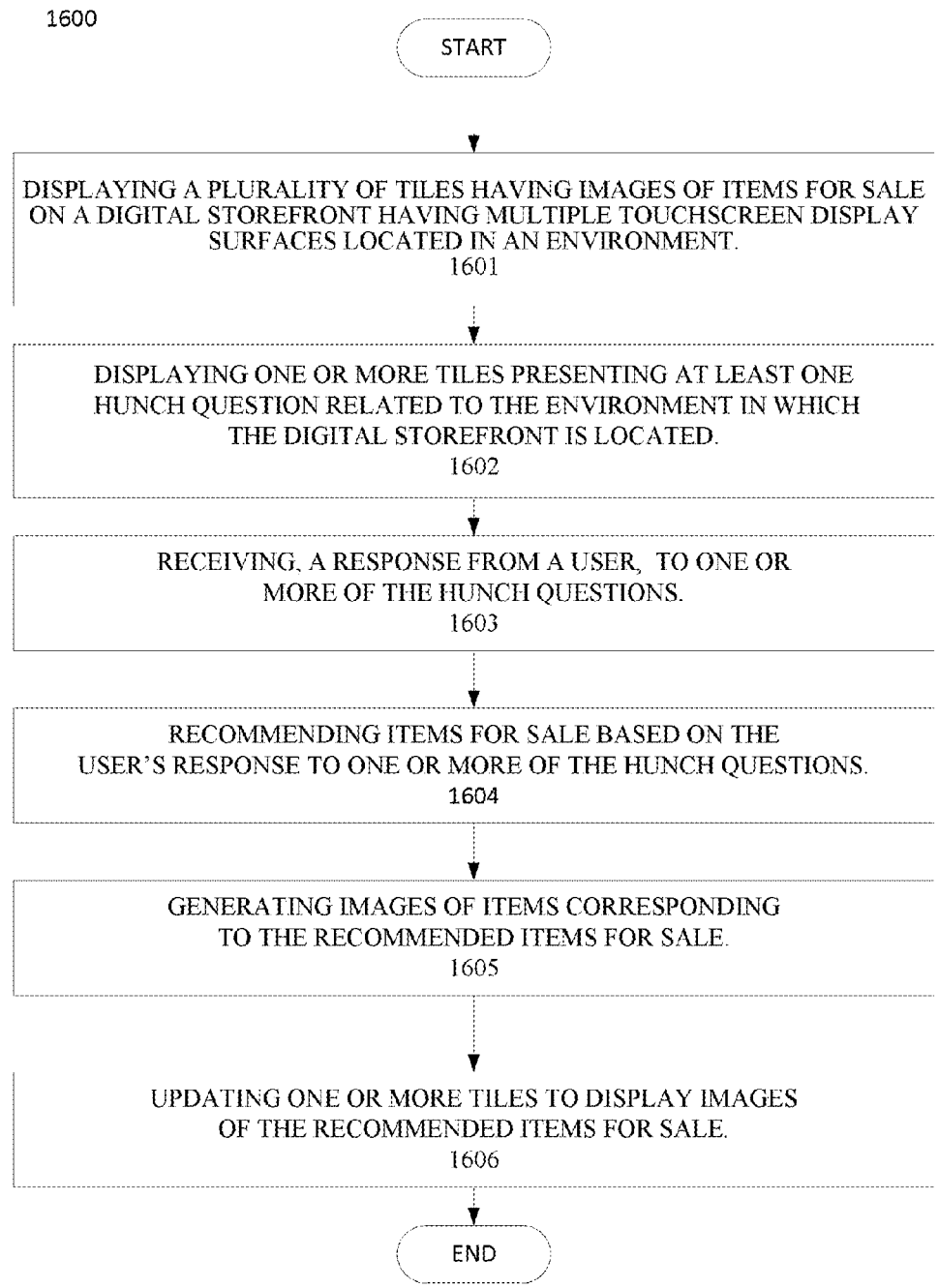
FIG. 16 illustrates a flow chart of a method of online shopping using a digital storefront, according to example embodiments.

FIG. 16 illustrates a flow chart 1600 of a method of online shopping using a digital storefront, according to example embodiments. A method for online shopping comprises: at block 1601, displaying a plurality of tiles having images of items for sale on a digital storefront having multiple touch-screen display surfaces located in an environment; at block 1602, displaying one or more tiles presenting at least one hunch question related to the environment in which the digital storefront is located; at block 1603 receiving, a response from a user, to one or more of the hunch questions; at block 1604, recommending items for sale based on the user's response to one or more of the hunch questions; at block 1605, generating images of items corresponding to the recommended items for sale; and at block 1606, updating one or more tiles to display images of the recommended items for sale. In further embodiments, the method of online shopping further comprises recommending items for sale based on the user's response to one or more of the hunch questions, account information and/or location-based information.

Figure 17:
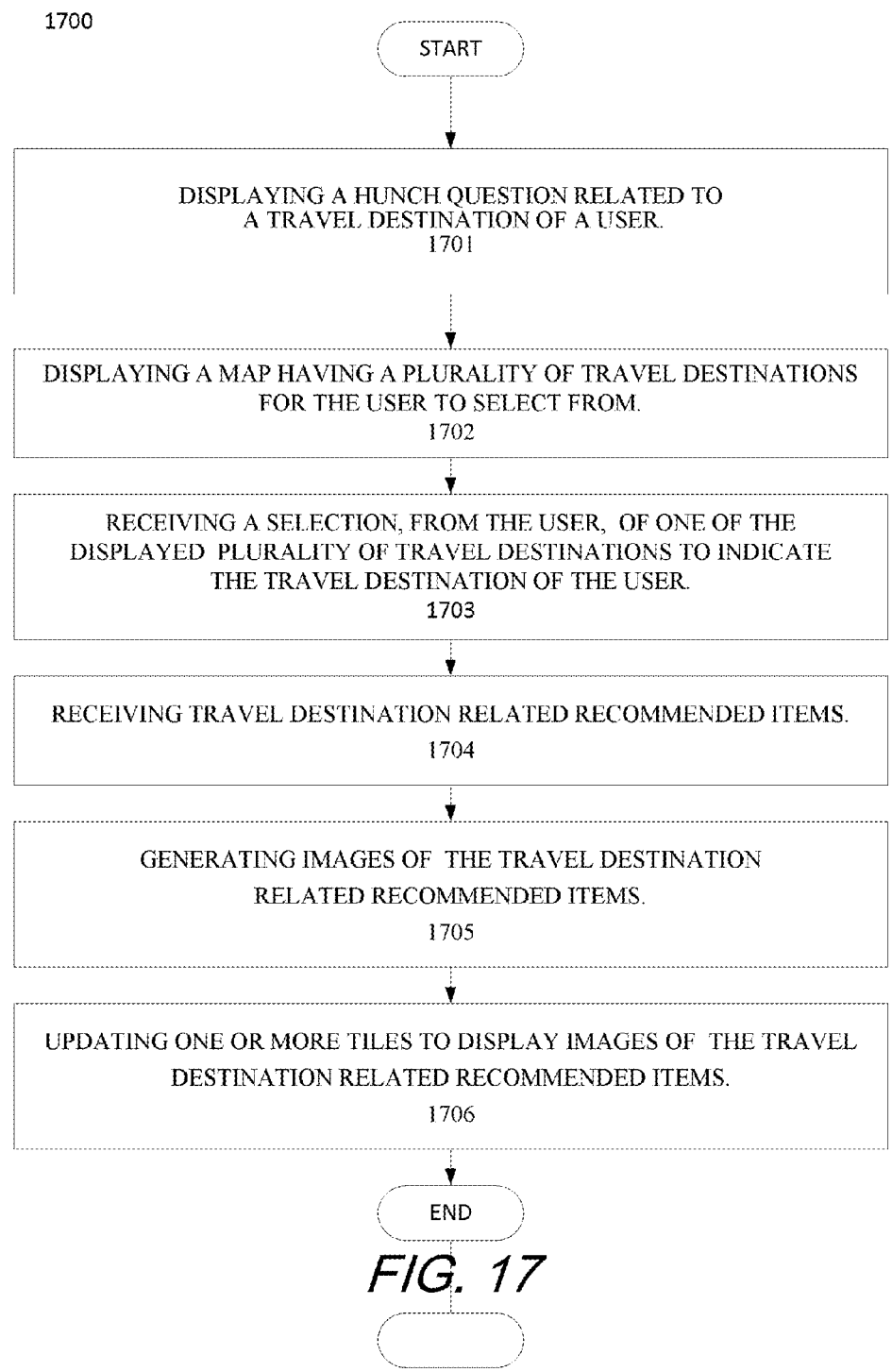
FIG. 17 illustrates a flow chart of a method of online shopping using a digital storefront located in a travel-related environment, according to example embodiments.

FIG. 17 illustrates a flow chart 1700 of a method of online shopping using a digital storefront located in a travel-related environment, according to example embodiments. The method for online shopping in a travel-related environment comprises: at block 1701, displaying a hunch question related to a travel destination of a user; at block 1702, displaying a map having a plurality of travel destinations for the user to select from; at block 1703, receiving a selection, from the user, of one of the displayed plurality of travel destinations to indicate the travel destination of the user; at block 1704, receiving travel destination related recommended items; at block 1705, generating images of the travel destination related recommended items; at block 1706, updating one or more tiles to display images of the travel destination related recommended items.

Figure 18:
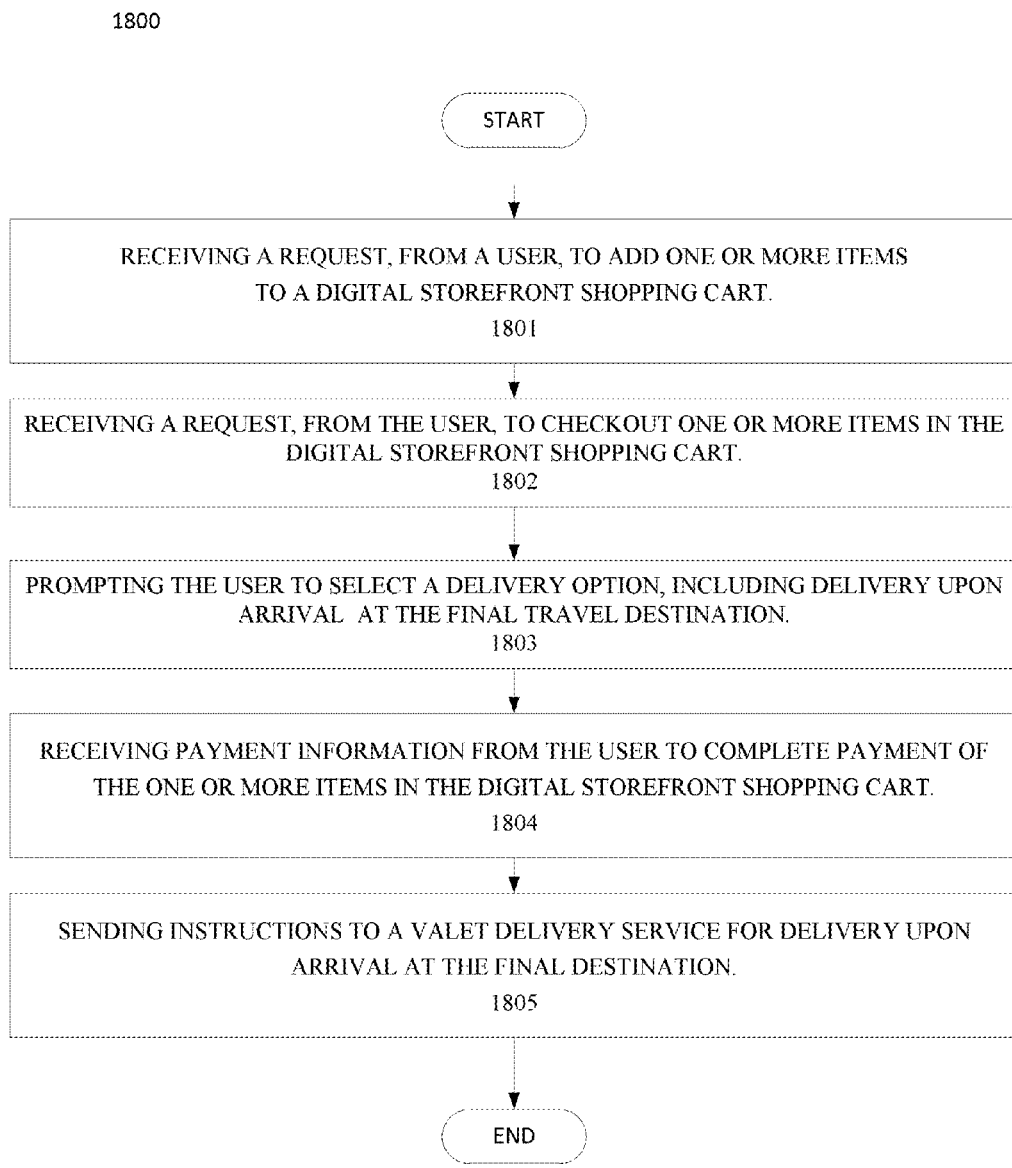
FIG. 18 illustrates a flow chart of a method of online shopping using a digital storefront to purchase selected items online, according to example embodiments.

FIG. 18 illustrates a flow chart 1800 of a method of online shopping using a digital storefront to purchase selected items online, according to example embodiments. The method of online shopping using the digital storefront to purchase selected items online comprises: at block 1801, receiving a request, from a user, to add one or more items to a digital storefront shopping cart; at block 1802, receiving a request, from a user, to check out one or more items in the digital storefront shopping cart; at block 1803 prompting a user to select a delivery option, including delivery upon arrival at the final travel destination; at block 1804, receiving payment information from the user to complete payment of the one or more items in the digital storefront shopping cart; and at block 1805, sending instructions to a valet delivery service for delivery upon arrival at the final destination.

Figure 19A:
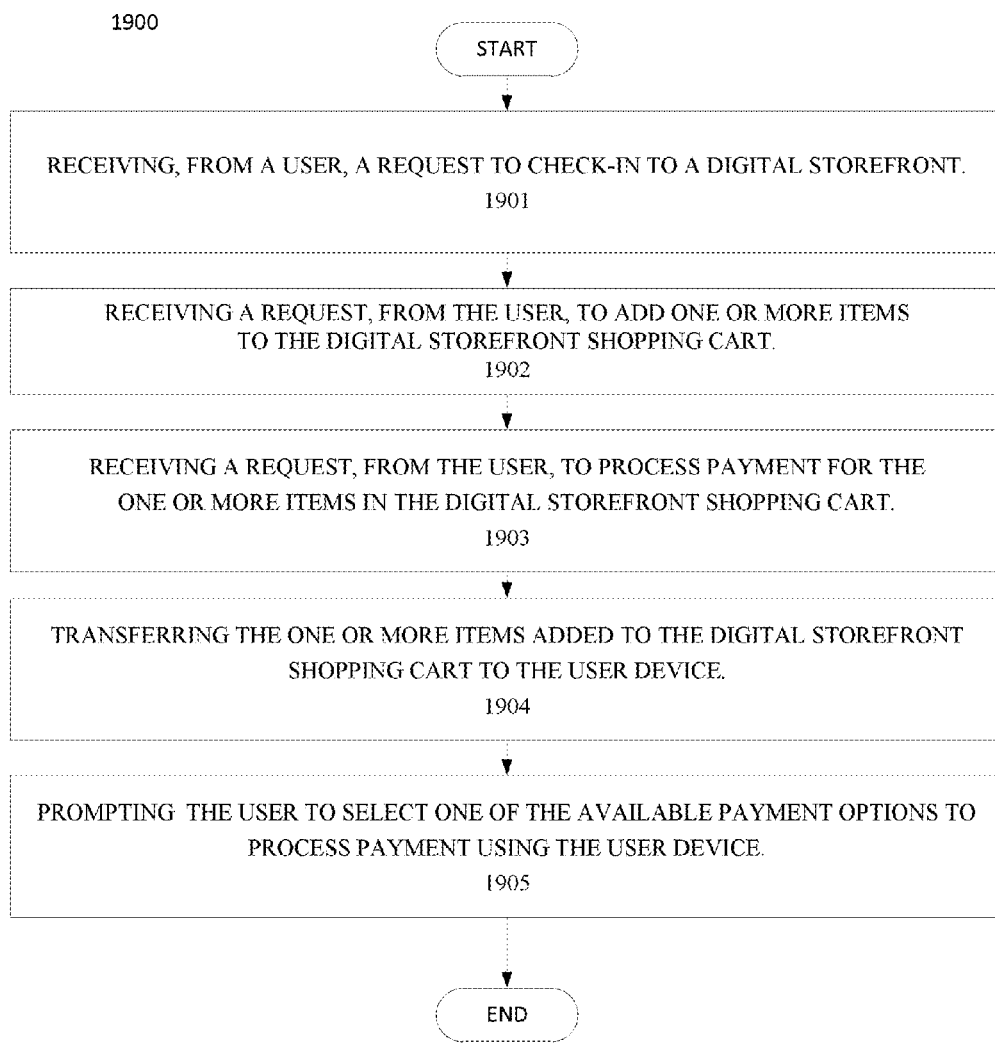
FIGS. 19a and 19b illustrate flow charts of a method of online shopping using a digital storefront and to transfer a shopping session from the digital storefront to a user device, according to example embodiments.
Figure 19B:
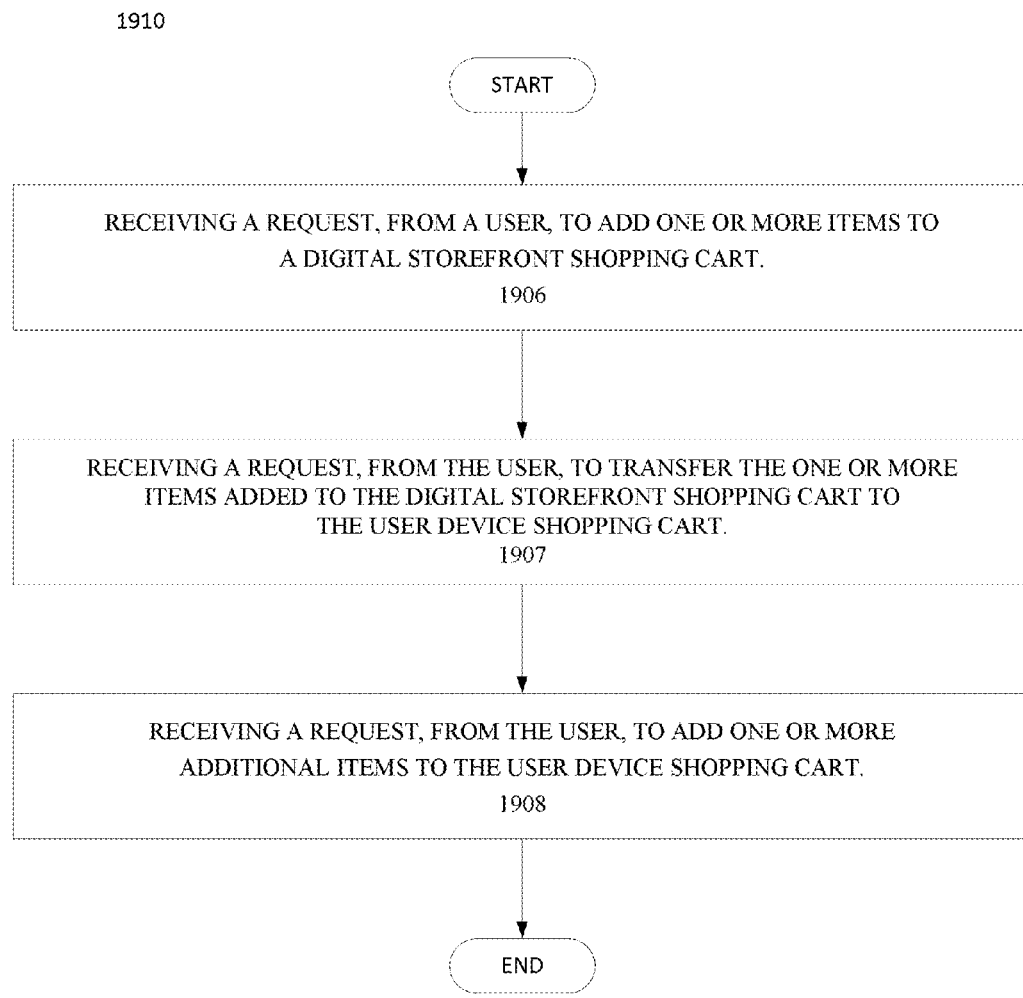

FIGS. 19a and 19b illustrate flow charts 1900 and 1910, respectively, of a method of online shopping using a digital storefront and to transfer a shopping session from the digital storefront to a user device, according to example embodiments. The shopping session may be transferred to the user device at any time during the shopping session, for example, while browsing items or when ready to checkout and process payment. The method of online shopping using the digital storefront to transfer a shopping session from the digital storefront to the user device comprises: at block 1901, receiving, from a user, a request to check-in to a digital storefront; at block 1902, receiving a request, from the user, to add one or more items to a digital storefront shopping cart; at block 1903, receiving a request, from the user, to process payment for the one or more items in the digital storefront shopping cart; at block 1904, transferring the one or more items added to the digital storefront shopping cart to the user device; at block 1905, prompting the user to select one of the available payment options to process payment using the user device. In a further embodiment, an online shopping method for transferring from a shopping session while browsing and selecting items comprises: at block 1906, receiving a request, from the user, to add one or more items to a digital storefront shopping cart; at block 1907, receiving a request, from the user, to transfer the one or more items added to the digital storefront shopping cart to the user device shopping cart; and at block 1908, receiving a request, from the user, to add one or more additional items to the user device shopping cart.

FIG. 20 illustrates a flow chart 2000 of a method of online shopping using a digital storefront and a user device to check-in and check-out, according to example embodiments. The method of online shopping using the digital storefront and a user device to check-in and check-out comprising: at block 2001 receiving an automatic check-in, from a beacon enabled user device, based on geographical proximity of the user device within a communication's zone of the digital storefront having a beacon device; and at block 2002 receiving an automatic check-out, from a beacon enabled user device, based on geographical proximity of the user device within the communication's zone of the digital storefront having a beacon device.

Figure 21:
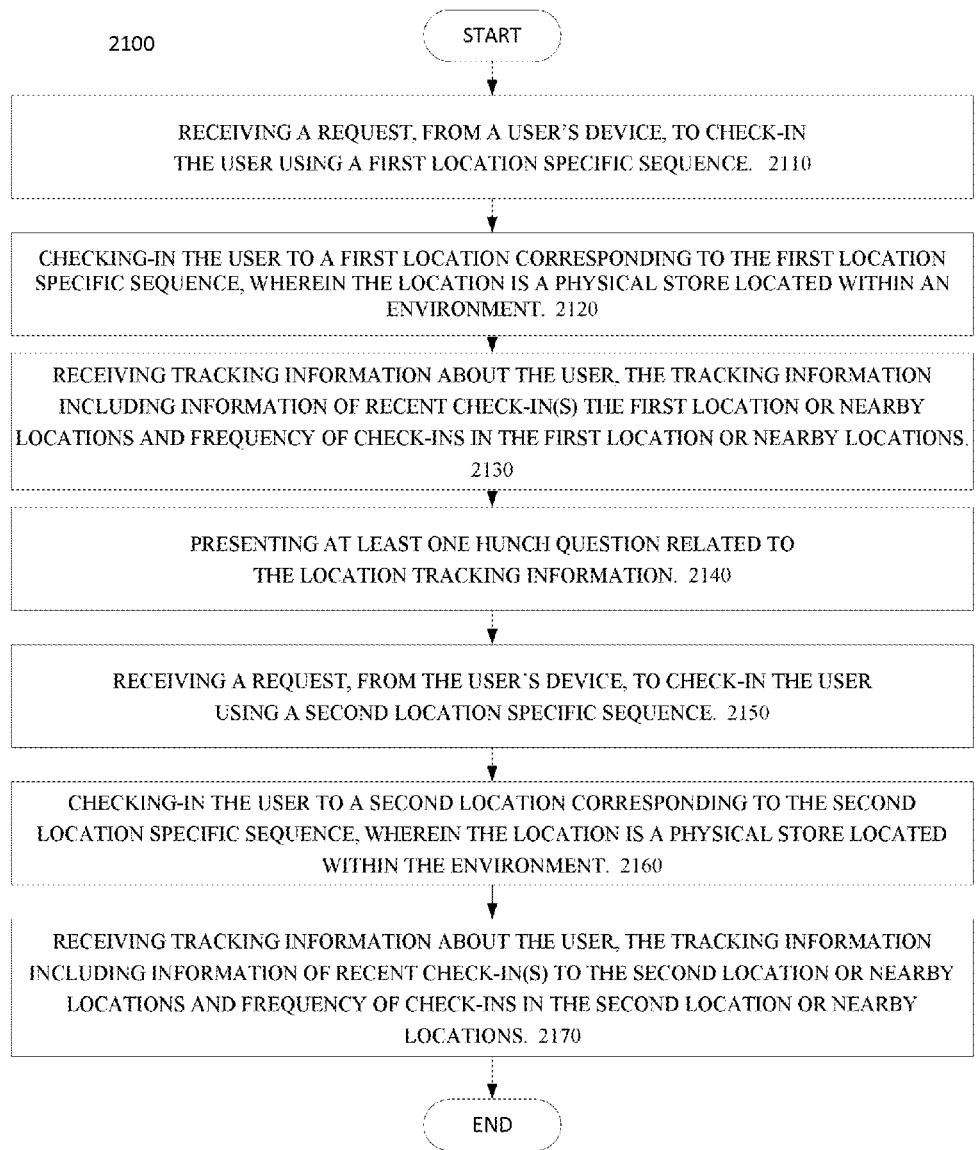
FIG. 21 illustrates a flow chart of a method of online shopping using a digital storefront and a user device to check-in, according to example embodiments.

FIG. 21 illustrates a flow chart 2100 of a method of online shopping using a digital storefront and a user device to check-in, according to example embodiments. The method of online shopping using the digital storefront and the user device to check-in comprising: at block 2110 receiving a request, from the user's device, to check-in the user using a first location specific sequence; at block 2120, checking-in the user to a first location corresponding to the first location specific sequence, wherein the location is a physical store located within the environment; at block 2130, receiving tracking information about the user, the tracking information including information of recent check-in(s) to the first location or nearby locations and frequency of check-ins in the first location or nearby locations; at block 2140, presenting at least one hunch question related to the location tracking information; at block 2150, receiving a request, from the user's device, to check-in the user using a second location specific sequence; at block 2160, checking-in the user to a second location corresponding to the second location specific sequence, wherein the location is a physical store located within the environment; at block 2170, receiving tracking information about the user, the tracking information including information of recent check-in(s) to the second location or nearby locations and frequency of check-ins in the second location or nearby locations.

Example Platform Architecture

Figure 22:
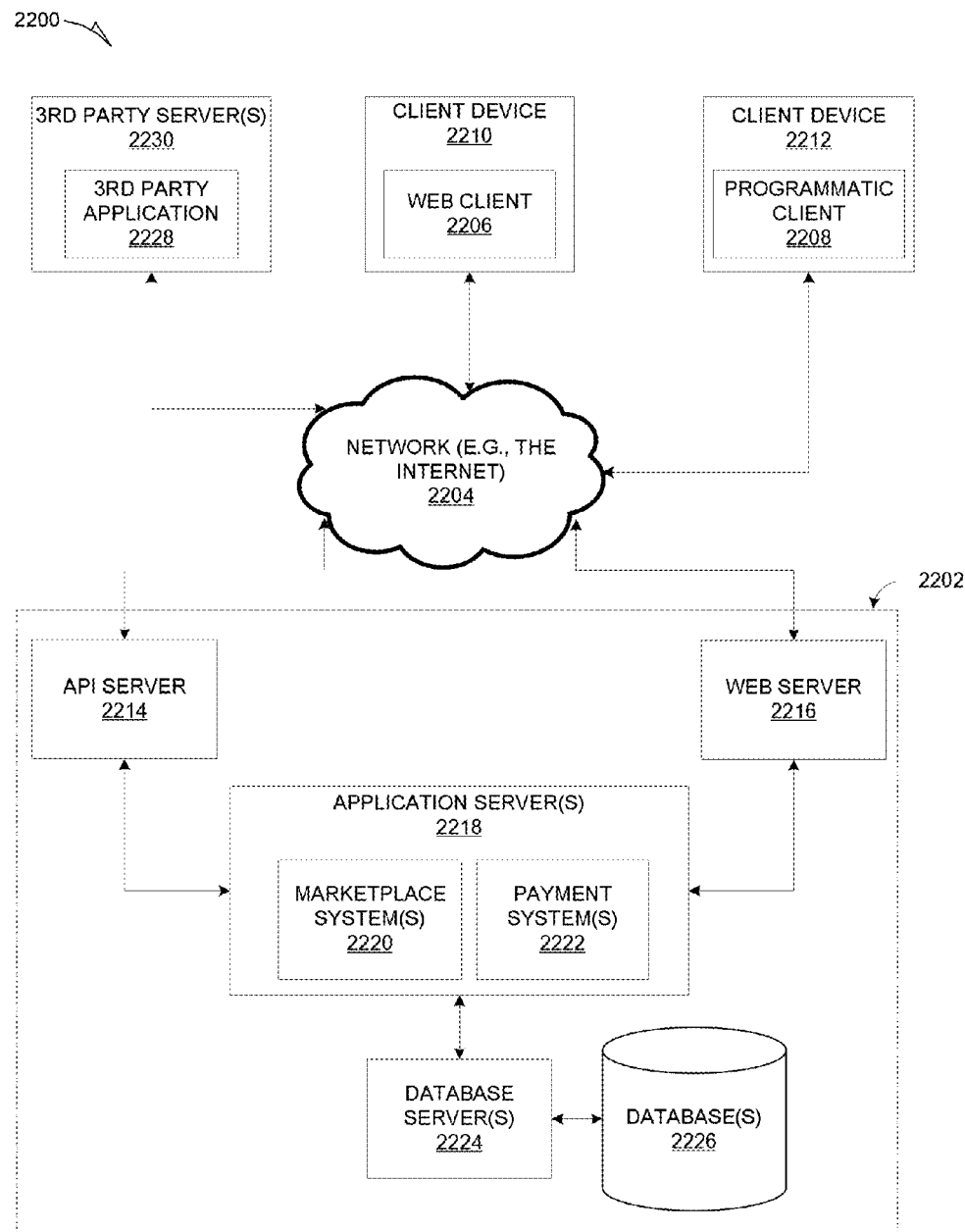
FIG. 22 is a network diagram depicting a client-server system, within which one example embodiment may be deployed.

FIG. 22 is a network diagram depicting a client-server system 2200, within which one example embodiment may be deployed. A networked system 2202, in the example forms of a network-based marketplace or publication system, provides server-side functionality, via a network 2204 (e.g., the Internet or Wide Area Network (WAN)) to one or more clients. FIG. 22 illustrates, for example, a web client 2206 (e.g., a browser, such as the Internet Explorer browser developed by Microsoft Corporation of Redmond, Wash. State), and a programmatic client 2208 executing on respective client machines 2210 and 2212.

An Application Program Interfaces (API) server 2214 and a web server 2216 are coupled to, and provide programmatic and web interfaces respectively to, one or more application servers 18. The application servers 2218 host one or more marketplace applications 2220 and payment applications 2222. The application servers 2218 are, in turn, shown to be coupled to one or more databases servers 2224 that facilitate access to one or more databases 2226.

The marketplace applications 2220 may provide a number of marketplace functions and services to users that access the networked system 2202. The payment applications 2222 may likewise provide a number of payment services and functions to users. The payment applications 2222 may allow users to accumulate value (e.g., in a commercial currency, such as the U.S. dollar, or a proprietary currency, such as "points") in accounts, and then later to redeem the accumulated value for items (e.g., goods or services) that are made available via the marketplace applications 2220. While the marketplace and payment applications 2220 and 2222 are shown in FIG. 22 to both form part of the networked system 2202, it will be appreciated that, in alternative embodiments, the payment applications 2222 may form part of a payment service that is separate and distinct from the networked system 2202.

Further, while the system 2200 shown in FIG. 22 employs a client-server architecture, the present invention is of course not limited to such an architecture, and could equally well find application in a distributed, or peer-to-peer, architecture system, for example. The various marketplace and payment applications 2220 and 2222 could also be implemented as standalone software programs, which do not necessarily have networking capabilities.

The web client 2206 accesses the various marketplace and payment applications 2220 and 2222 via the web interface supported by the web server 2216. Similarly, the programmatic client 2208 accesses the various services and functions provided by the marketplace and payment applications 2220 and 2222 via the programmatic interface provided by the API server 2214. The programmatic client 2208 may, for example, be a seller application (e.g., the TurboLister application developed by eBay Inc., of San Jose, Calif.) to enable sellers to author and manage listings on the networked system 2202 in an off-line manner, and to perform batch-mode communications between the programmatic client 2208 and the networked system 2202.

FIG. 22 also illustrates a third party application 2228, executing on a third party server machine 2230, as having programmatic access to the networked system 2202 via the programmatic interface provided by the API server 2214. For example, the third party application 2228 may, utilizing information retrieved from the networked system 2202, support one or more features or functions on a website hosted by the third party. The third party website may, for example, provide one or more promotional, marketplace or payment functions that are supported by the relevant applications of the networked system 2202.

Marketplace Applications

Figure 23:
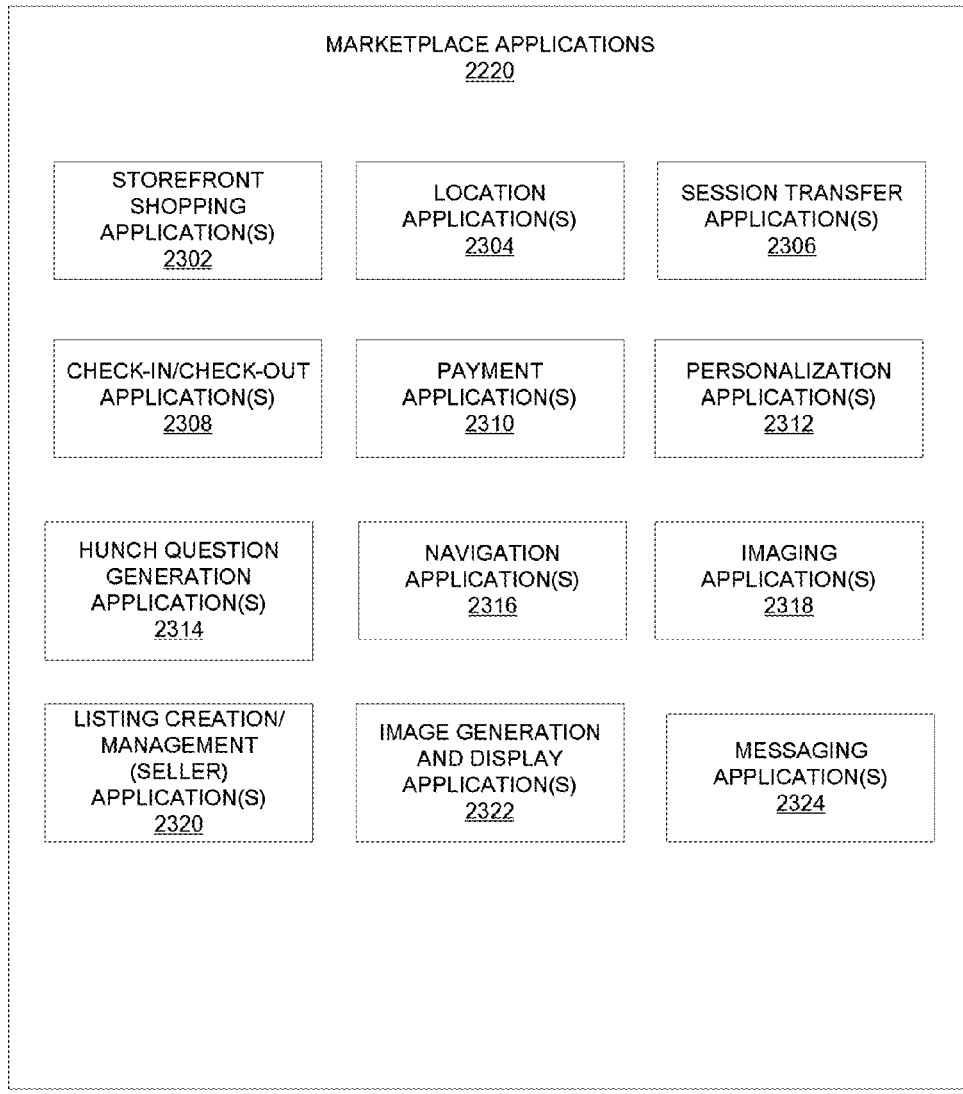
FIG. 23 is a block diagram illustrating multiple marketplace applications that, in one example embodiment, are provided as part of a networked system.

FIG. 23 is a block diagram illustrating multiple applications 2220 that, in one example embodiment, are provided as part of the networked system 2202. The applications 2220 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 2226 via the database servers 2228.

The marketplace applications 2220 are shown to include a storefront shopping application(s) 2302, which may incorporate or integrate one or more features of other marketplace applications 2220 shown in FIG. 23.

Storefront shopping application(s) 2302 allows user 110 to shop online using digital storefront 104 within an environment, and to transfer a shopping session from digital storefront 104 to user device 102 anytime during user's shopping experience. The storefront shopping application(s) 2302 leverages functionality from the other marketplace applications shown in FIG. 23 to provide a seamless online shopping experience personalized for user 110. The location application(s) 2304, session transfer application(s) 2306, check-in/check-out application(s) 2308, payment application(s) 2310, hunch question generation application(s) 2314, the image generation and display application(s) 2322 may be integrated with storefront application(s) 2302 to create a single or multiple marketplace application(2) 2220, for example embodiments. In alternative embodiments, the various marketplace application(s) shown in FIG. 23 may be standalone applications.

The storefront shopping application(s) 2302 presents items for sale (from various merchants) to user 110. The items presented to user 110 are personalized for user 110 from recommendations generated based on user responses to one or more hunch questions, location-based information, and/or account information provided by checking-in to storefront shopping application(s) and/or checking-in to locations associated with beacon devices 135. The product/service recommendations selected for user 110 are presented to user using an interactive touchscreen that displays multiple dynamic tiles. The image generation and display application(s) 2314 generates the images displayed by the tiles. The content for the tiles is generated by the storefront shopping application(s) 2302 from recommendations based on information received from one or more of the following application(s): location application(s) 2304, check-in/check-out application(s) 2308, and/or hunch question generation application(s) 2314 in various embodiments. During a shopping session on digital storefront 104, user 110 may check-in, and once checked-in, user 110 may transfer the shopping session from digital storefront 104 to user device 102 at any time, and may save a shopping session for later access on the same or different user device 102. For example, the shopping session may be transferred after all items have been selected and user 110 is ready to process payment, or the shopping session may be transferred while user 110 is still browsing and selecting items for user's 110 shopping cart. The storefront shopping application(s) 2302 predicts, recommends, identifies and/or generates content for display on digital storefront 104 to generate a personalized shopping experience for user 110.

For example embodiments, location-based information about user 110 may be tracked using location application(s) 2304 while user device 102 is within the communications zone of one or more beacon devices 135 in example embodiments. In alternative embodiments, other short range communication devices may be used, such as NFC enabled devices rather than beacon devices. In further embodiments, beacon enable user devices may be used in conjunction with GPS devices, where the beacon enabled devices provide more precise (finer grain) geo-location information and user tracking. The location application(s) 2304 may provide location-based information, such as location tracking information and past purchase history information, about user 110 within an environment having beacon devices or beacon-like devices. The location-based information generated by locations application(s) 2304 is provided to storefront shopping application(s) 2302 to generate product recommendations for use 110. The location application(s) 2304 may request location-based check-in using the process flows described in FIGS. 14 and 15. Beacon enabled user devices, such as user device 102, may receive personalized location based notifications and actions within the communications range of one or more beacon devices 135 within an environment. Suitable environments for beacon devices 135 include airports, subway stations, train stations, other mass transit system stations, physical stores, shopping malls, other retail shopping establishments, hotels, casinos, business and convention centers, sports and entertainment stadiums and venues, theme parks, museums, zoos, aquariums, or other locations suitable for one or more digital storefronts.

In some embodiments, checking user device 102 into a location may allow user 110 through user device 102, to access features, specials, offers, and the like offered by merchants selling items through digital storefront 104 at a location associated with beacon device 135. In some embodiments, these features, specials, offers, and the like may be provided and processed by remote server 106 or local server 139 on behalf of digital storefront 104.

The check-in/check-out application 2308 on user device 102 may allow user 110 to check-in digital storefront 104 using a check-in and/or payment provider platform or service such as may be provided by PayPal, Inc. of San Jose, Calif., Foursquare of New York, N.Y., Facebook, Inc., of Menlo Park, Calif., or Google+ of Google, Inc. of Mountain View, Calif., and implemented by remote server 106. In some embodiments, checking-in to a digital storefront 104 while shopping may provide user 110 with personalized shopping recommendations and allow user to purchase and pay for items, and select available delivery options for items purchased. The merchant's products and services provided offered for sale through online shopping at the digital storefront 104 are collectively called "items". In further embodiments, checking-in may provide user 110 with additional social options, such as sharing items through one or more social networks (e.g., Facebook, Pinterest, Linked, Twitter, etc.), or may present user with a list of other users, colleagues, acquaintances, contacts, and the like that are also checked in to the location or a nearby location.

Payment application(s) 2310 may provide functionality for a user to purchase items online using digital storefront 104. For example, when user 110 selects on one of the product items, the digital storefront may display an icon entitled "purchase". When the user selects on this icon, the user may enter information to order the item (e.g., financial information such as credit card number, a delivery address, or simply an e-mail address associated with a PayPal account). Accordingly, shoppers may be able to touch the screens to order and have items delivered to them within an hour via courier in example embodiments. Payment may accepted by the couriers through online financial accounts (e.g., PayPal, or PayPal Here, a mobile payment service developed by eBay).

Hunch question generation applications 2314 may provide functionality to generate hunch questions, which are presented to user 110 to help discover a user's 110 affinity for anything, from books to electronic gadgets to fashion or vacation spots. In various embodiments, hunch questions are generated by combining algorithmic machine learning and user-curated content to provide the user with personalized shopping recommendations. The hunch question generation application 2314 presents an initial hunch question to user 110 based on an environment in which digital storefront 104 is located. For example, if digital storefront 104 is located at an airport, a hunch questions such as "Where are you going?" is based on the travel environment in which digital storefront 104 is located. Additional hunch questions may be presented to a user, which may or may not be related to the environment where digital storefront 104 is located.

The initial and/or follow-on hunch questions may be related to the environment and based on responses from shoppers, and may be further refined to be environment related or non-environment related. In further embodiments, hunch questions may be generated using location-based information once users 110 are checked-in to locations associated with beacon devices 135, and are within a communications range of such beacon devices 135. In yet other embodiments, hunch questions may be generated using account information from users who are checked into a digital storefront 104. In other embodiments, hunch questions may be generated by combining algorithmic machine learning and user created content/information such as hunch question responses, location-based user information, and user account information.

The image generation and display application(s) 2312 may provide functionality to generate images of merchant's products and services for sale and the content on digital storefront 104. In some embodiments, images for content associated with one or more retail stores, online stores, or marketplace is generated and displayed on digital storefront 104. In example embodiments, different categories of items or collections of items are displayed in different tiles on interactive touchscreen 138, and when user 110 selects on one of the categories or collections, the user is presented with various product items in this category. The image generation and display application(s) 2312 displays dynamically changing content, personalized for a user, based on user responses to hunch questions presented to a user, location-based user information, account information that is accessible when a user checks-in to a storefront shopping application. For example, image generation and display application(s) 2312 may generate and display a map of possible travel destinations, as shown in FIGS. 7-8. FIGS. 5-10 illustrate images of items or collection of items, presented in one or more tiles on an interactive touchscreen. In additional to dynamically changing content presented in the live tiles, image generation and display application(s) 2312 may also dynamically resize tiles in various embodiments. For example, when user 110 selects a tile that presents items user 110 in interested in viewing further, that selected tile increases in size while other tiles are pushed to the side and/or decreased in size. The image generation and display application(s) 2312 may also present content on user device 102, to allow user 110 to continue shopping on user device 102 after a shopping session has been transferred to user device 102. For example, FIG. 11 illustrates a shopping session transferred to a user device, such that user 110 may proceed with checkout for payment processing on the user device. In further embodiments, image generation and display application(s) 2312 presents one or more hunch questions to a user and based on the user's response to the hunch questions (and other information such as location-based information and account information in some embodiments), presents new content to the user in one or more of the live tiles. In various embodiments, image generation and display application(s) 2312 generates and displays content related to various product items for sale by the retail stores, including item descriptions, pictures, videos, catalogues, product comparison information/tables, advertisements, coupons, promotions, offers, deals, menus, and so on may be displayed.

Session transfer applications 2306 allow user 110 to transfer a shopping session from digital storefront 104 to user device 102. In various embodiments, a shopping session may be transferred at any time during the shopping experience, and it not limited to checkout. For example, in some embodiments, after the user adds various items to their shopping cart or bag on the digital storefront, user 110 may select a "purchase" button, "get it" button, "check out" button, etc., displayed on the interactive touchscreen of the digital storefront 104. Thereafter, the interactive touchscreen of digital storefront 104 may display a virtual keypad and prompt the user to enter their telephone number. After the user enters their telephone number, the phone number may be transmitted to a server, and an application associated with the server may transmit a text message (e.g., MMS message or SMS message) to user device 102 with information for completing the purchase. For example, the text message may include a link to a purchase webpage (for rendering by a web browser of the user's smartphone) for user 110 to enter financial information, delivery address, PayPal account information, etc., and complete the purchase. In some embodiments, the digital storefront may prompt the user for their e-mail address, screen name, social media handle, etc., and the e-mails or instant messages may be transmitted, instead of or in addition to text messages. In some embodiments, instead of entering a phone number, the digital storefront may display a QR code, and when user 110 takes a photograph of the QR code with their user devices 102, a browser of the user device 102 displays a purchase page for the user to complete the purchase. In other embodiments, the digital storefront 104 may display a passcode associated with the checkout items, and the user may enter the passcode into a mobile application installed on the user device, or a retail store webpage displayed in a web browser of user device 102.

According to various embodiments, a session or connection may be established between a user device and a digital storefront to enable a transferring the shopping session from digital storefront 104 to user device 102, using various techniques such as by scanning a QR code displayed on the digital storefront; by entering a phone number via keypad displayed on digital storefront 104 or using a biometric sign-in (e.g., thumb print) and then receiving a text message with various information to launch a webpage in a web browser, and so on. In alternative embodiments, a session or connection may be established by checking-in to digital storefront 104 (to activate an appropriate mobile app (e.g., eBay mobile app) or log into an appropriate site (e.g., eBay.com)) and then using a cloud-based transfer of items to a user's cart and viewable on user device 102. Furthermore, a session may be terminated manually or automatically using a mobile app, website, beacon notification based on location information in various embodiments.

After a session or connection is established between a user device and digital storefront 104, content may be pushed to the user device via text messages, or content may be displayed in webpages on the web browser of the user device or through a storefront shopping app residing on user device 102. Accordingly, the user may be presented with personalized content displayed on the dynamic tiles such as tailored hunch questions and/or recommended products/services for purchase selected for the user. For example, if user 110 uses digital storefront 104 to browse items and selects a few items for purchase by placing it in their shopping cart, then information related to these items may be passed to user device 102.

Personalization applications 2312 allow users of the networked system 2202 to personalize various aspects of their interactions with the networked system 2202. For example a user may, utilizing an appropriate personalization application 2312, create a personalized reference page at which information regarding transactions to which the user is (or has been) a party may be viewed. Further, a personalization application 2312 may enable a user to personalize listings and other aspects of their interactions with the networked system 2202 and other parties. In additional examples, a personalization application 2312 may allow user 110 to personalize features of the digital storefront application 2302, in particular, with respect to tracking location-based user information.

Navigation of the networked system 2202 may be facilitated by one or more navigation application(s) 2316. For example, a search application (as an example of a navigation application) may enable key word searches of listings published via the networked system 2202. A browse application may allow users to browse various category, catalogue, or inventory data structures according to which listings may be classified within the networked system 2202. Various other navigation application(s) may be provided to supplement the search and browsing applications. For example, navigation application(s) 2316 may allow a user to navigate through various tiles on touchscreen 138 to browse items for sale by various merchants on digital storefront 104. In other examples, navigation application 2316 allows a user to browse and purchase items on user device 102 once a shopping session has been transferred.

In order to make listings, available via the networked system 2202, as visually informing and attractive as possible, the marketplace application(s) 2320 may include one or more imaging application(s) 2318 utilizing which users may upload images for inclusion within listings. The imaging application(s) 2316 also operates to incorporate images within viewed listings. The imaging application(s) 2316 may also support one or more promotional features, such as image galleries that are presented to potential buyers. For example, sellers may pay an additional fee to have an image included within a gallery of images for promoted items. For other examples, imaging application(s) may be used to detect users in front of digital storefront 104, or traffic patterns of users in front of digital storefront 104.

Listing creation/management application(s) 2320 allow sellers conveniently to author listings pertaining to goods or services that they wish to transact via the networked system 2202, and listing management applications 2320 allow sellers to manage such listings. Specifically, where a particular seller has authored and/or published a large number of listings, the management of such listings may present a challenge. The listing management applications 2320 provide a number of features (e.g., auto-relisting, inventory level monitors, etc.) to assist the seller in managing such listings.

Messaging application(s) 2324 are responsible for the generation and delivery of messages to users of the networked system 2202, such messages for example prompting user 110 to check-in to digital storefront application 104 or notify user 110 that he/she is near a digital storefront. Respective messaging applications 2324 may utilize anyone of a number of message delivery networks and platforms to deliver messages to users. For example, messaging applications 2324 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Example Machine Architecture and Machine-Readable Medium

Figure 24:
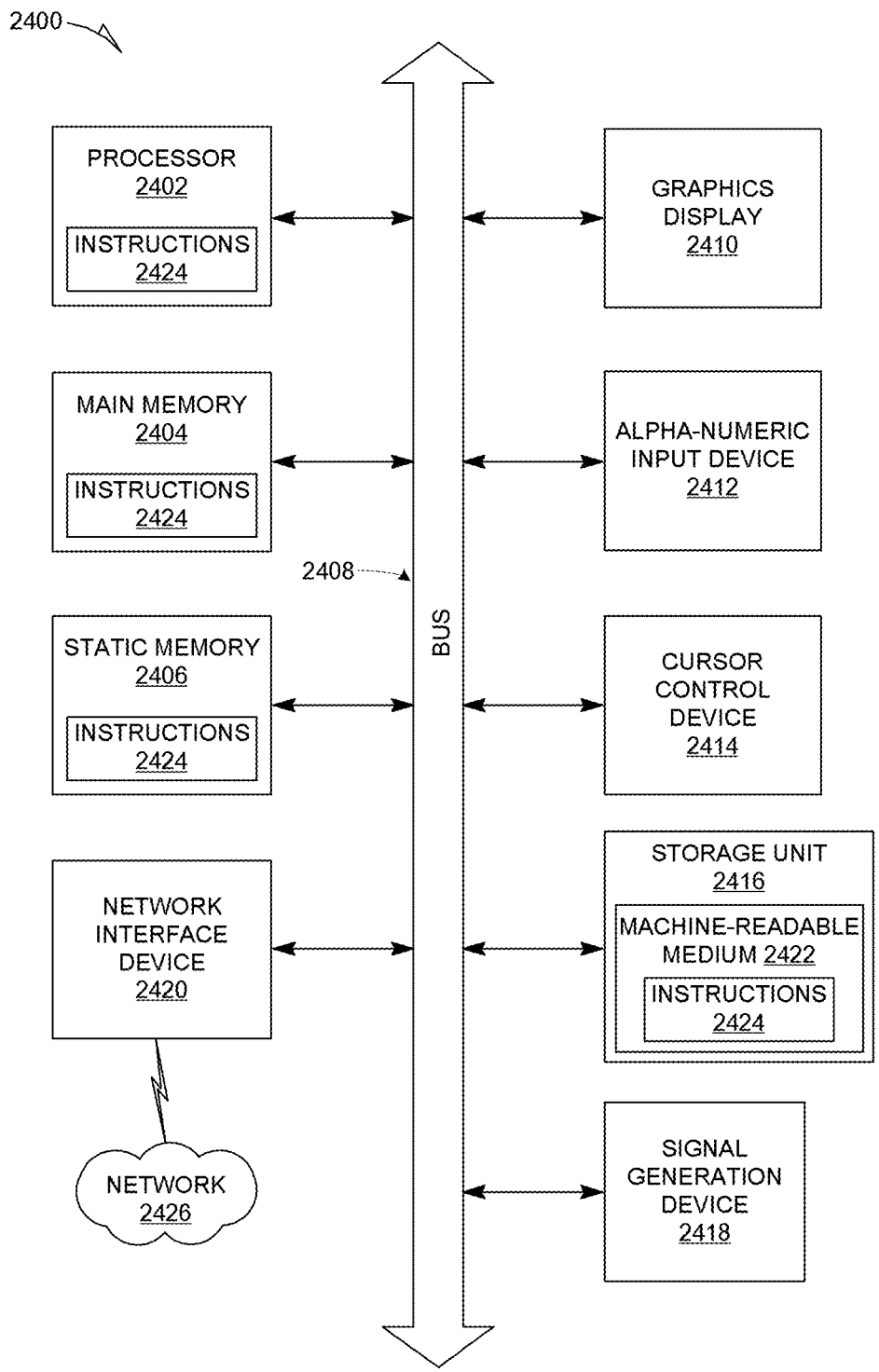
FIG. 24 shows a diagrammatic representation of machine in the example form of a computer system within which a set of instructions when executed may cause the machine to perform any one or more of the methodologies discussed herein.

FIG. 24 shows a diagrammatic representation of machine in the example form of a computer system 2400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2400 includes a processor 2402 (e.g., a central processing unit (CPU) a graphics processing unit (GPU) or both), a main memory 2404 and a static memory 2406, which communicate with each other via a bus 2408. The computer system 2400 may further include a video display unit 2410 (e.g., a liquid crystal display (LCD) or a cathode ray tube (CRT)). The computer system 2400 also includes an alphanumeric input device 2412 (e.g., a keyboard), a cursor control device 2414 (e.g., a mouse), a disk drive unit 2416, a signal generation device 2418 (e.g., a speaker) and a network interface device 2420.

The disk drive unit 2416 includes a machine-readable medium 2422 on which is stored one or more sets of instructions (e.g., software 2424) embodying any one or more of the methodologies or functions described herein. The software 2424 may also reside, completely or at least partially, within the main memory 2404 and/or within the processor 2402 during execution thereof by the computer system 2400, the main memory 2404 and the processor 2402 also constituting machine-readable media.

The software 2424 may further be transmitted or received over a network 1726 via the network interface device 2420 by any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

While the machine-readable medium 2422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, methods and systems for online shopping using a digital storefront have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Note on the Abstract

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of online shopping, comprising:
   receiving, by a server, proximity information indicating that a user device is within close proximity to a digital storefront in an environment where users are temporarily within close proximity to the digital storefront while the users pass or stop in front of the digital storefront, the server representing at least one of a local server or a remote server associated with the digital storefront, the user device is associated with a user, the digital storefront having multiple touchscreen display surfaces;
   responsive to receiving the proximity information, providing display information to a user device inviting the user to check-in to a shopping application associated with the digital storefront;
   receiving, by the shopping application associated with the digital storefront, check-in information to initiate a session on one of the multiple touchscreen display surfaces of the digital storefront, at least one of the multiple touchscreen display surfaces having a size that is capable of displaying tiles that are visible to a person standing in front of the digital storefront, at least some of the tiles representing dynamically changing tiles;
   responsive to receiving the check-in information, accessing user account information;
   generating an initial question to discover the user's affinity on a variety of topics to create a personalized shopping experience for the user on the digital storefront;
   presenting the initial question on one or more of the tiles on the touchscreen display surface based on the environment;
   receiving a response to the initial question from the user;
   generating, using a processor of a machine, at least one refined question using algorithmic machine learning trained with sample training data to discover the user's affinity on the variety of topics based on the accessed user account information and the received response from the user to the initial question;
   presenting a refined question on one or more of the tiles on the touchscreen display surface;
   receiving a response to the refined question from the user;
   determining items to recommend for sale based on the received response to the refined question from the user;
   displaying images of the items recommended for sale on at least some of the dynamically changing tiles; and
   continuing to generate and present additional refined questions until the session on the touchscreen display surface has ended.

2. The method of claim 1, wherein presenting the initial question on one or more of the tiles on the touchscreen display surface based on the environment further comprises:
   displaying a question related to a travel destination of the user; and
   wherein receiving, the response to the initial question from the user further comprises:
   displaying a map having a plurality of travel destinations for the user to select from; and
   receiving a selection, from the user, of one of the displayed plurality of travel destinations to indicate the travel destination of the user.

3. The method of claim 2, wherein the displayed images of the items recommended for sale on at least some of the dynamically changing tiles represents travel destination related items.

4. The method of claim 1, wherein the environment in which the digital storefront is located is one of an airport, train station, subway station or other mass transit system station, and wherein the environment is at a starting travel destination of the user and a second environment is at a final travel destination of the user.

5. The method of claim 4, further comprising:
   receiving a request, from the user, to add one or more items to a digital storefront shopping cart associated with the shopping application;
   receiving a request, from the user, to checkout one or more items in the digital storefront shopping cart associated with the shopping application;
   prompting the user to select a delivery option, including delivery upon arrival at the final travel destination.

6. The method of claim 4, further comprising:
   receiving payment information from the user to complete payment of the one or more items in the digital storefront shopping cart associated with the shopping application; and
   sending instructions to a valet delivery service for delivery upon arrival at the final destination within the second environment.

7. The method of claim 4, wherein displaying images of the items recommended for sale on the dynamically changing tiles further comprises displaying at least one tile having images of the items recommended for sale from a physical store located within the second environment at the final travel destination.

8. The method of claim 1, wherein receiving, by the shopping application associated with the digital storefront, check-in information to initiate the session on one of the multiple touchscreen display surfaces further comprises:
   sending a check-in request to the user device to invite the user to check-in to the digital storefront via the user device; and
   receiving, from the user, a request to check-in to the digital storefront.

9. The method of claim 1, wherein receiving, by the shopping application associated with the digital storefront, check-in information from a user to initiate the session on one of the multiple touchscreen display surfaces further comprises:
  displaying a check-in request to the user via one of the digital storefront interactive touchscreen displays; and
  receiving, from the user, a request to check-in to the digital storefront.

10. The method of claim 1, further comprising:
  receiving a request, from the user, to add one or more items to a digital storefront shopping cart associated with the shopping application;
  receiving a request, from the user, to process payment for the one or more items in the digital storefront shopping cart associated with the shopping application;
  transferring the one or more items added to the digital storefront shopping cart associated with the shopping application to an shopping application running on the user device; and
  prompting the user to select one of the available payment options to process payment using the user device.

11. The method of claim 1, further comprising:
  receiving a request, from the user, to add one or more items to a digital storefront shopping cart associated with the shopping application;
  receiving a request, from the user, to transfer the one or more items added to the digital storefront shopping cart associated with the shopping application to a shopping cart associated with a shopping application running on the user device; and
  receiving a request, from the user, to add one or more additional items to he shopping cart associated with the shopping application running on the user device.

12. The method of claim 1, wherein the digital storefront is associated with a beacon device;
  wherein receiving, by the shopping application associated with the digital storefront having multiple touchscreen display surfaces located in the environment, check-in information from the user to initiate the session on one of the multiple touchscreen display surfaces further comprises receiving an automatic check-in, from a beacon enabled user device, based on geographical proximity of the beacon enabled user device within a communication zone of the beacon device associated with the digital storefront; and
  further comprising receiving an automatic check-out, from the beacon enabled user device, based on geographical proximity of the beacon enabled user device moving outside the communication zone of the beacon device associated with the digital storefront.

13. The method of claim 1, wherein receiving, by the shopping application associated with the digital storefront, check-in information to initiate the session on one of the multiple touchscreen display surfaces further comprises:
  receiving a request, from the user's device, to check-in the user using a first location specific sequence;
  checking-in the user to a first location corresponding to the first location specific sequence, wherein the location is a physical store located within the environment;
  receiving tracking information about the user, the tracking information including information of one or more recent check-ins to the first location or nearby locations and frequency of check-ins in the first location or nearby locations; and
  wherein presenting a refined question on one or more of the tiles on the touchscreen display surface further comprises presenting at least one question related to the tracking information.

14. The method of claim 13, further comprising:
  receiving a request, from the user device, to check-in the user using a second location specific sequence;
  checking-in the user to a second location corresponding to the second location specific sequence, wherein the second location is a physical store located within the environment;
  receiving tracking information about the user, the tracking information including information of one or more recent check-ins to the second location or nearby locations and frequency of check-ins in the second location or nearby locations.

15. A method of online shopping, comprising:
  discovering a beacon enabled device associated with a user within a communication range of a digital storefront, the digital storefront having multiple touchscreen display surfaces located in an environment where users are temporarily within close proximity to the digital storefront as the users pass or stop in front of the digital storefront, the digital storefront associated with a beacon device, at least one of the multiple touchscreen display surfaces representing a life-size display that displays a plurality of tiles, at least some of the tiles representing dynamically changing tiles;
  providing, to the beacon enabled device associated with the user within the communication range, an invitation to shop at the digital storefront;
  receiving, by a shopping application associated with the digital storefront, check-in information from the user to initiate a session on one of the multiple touchscreen display surfaces of the digital storefront;
  responsive to receiving the check-in information, accessing user account information and location-based user information associated with the beacon device;
  generating an initial question to discover the user's affinity on a variety of topics to create a personalized shopping experience for the user on the digital storefront;
  presenting the initial question on one or more of the tiles on the touchscreen display surface based on the environment;
  receiving a response to the initial question from the user;
  generating, using a processor of a machine, at least one refined question using algorithmic machine learning trained with sample training data to discover the user's affinity on the variety of topics based on the accessed user account information and the received response from the user to the initial question;
  presenting a refined question on one or more of the tiles on the touchscreen display surface, receiving a response to the refined question from the user;
  determining items to recommend for sale based on at least one of the received response to the refined question from the user, and the accessed user account information and location-based user information;
  displaying images of the items recommended for sale on at least some of the dynamically changing tiles; and
  continuing to generate and present additional refined questions until the session on the touchscreen display surface has ended.

16. An online shopping system, comprising:
a processor;
a network interface device, coupled to the processor, to communicate with a network; and
a memory including instructions, when executed by the processor, causes the system to:
receive, by a server, proximity information indicating that a user device is within close proximity to a digital storefront in an environment where users are temporarily within close proximity to the digital storefront while the users pass or stop in front of the digital storefront, the server representing at least one of a local server or a remote server associated with the digital storefront, the user device is associated with a user, the digital storefront having multiple touchscreen display surfaces;
responsive to receiving the proximity information, provide display information to the user device inviting the user to check-in to a shopping application associated with the digital storefront;
receive, by the shopping application associated with the digital storefront, check-in information to initiate a session on one of the multiple touchscreen display surfaces of the digital storefront, at least one of the multiple touchscreen display surfaces having a size that is capable of displaying tiles that are visible to a person standing in front of the digital storefront, at least some of the tiles representing dynamically changing tiles;
responsive to receiving the check-in information, accessing user account information;
generate an initial question to discover the user's affinity on a variety of topics to create a personalized shopping experience for the user on the digital storefront;
present the initial question on one or more of the tiles on the touchscreen display surface based on the environment;
receive a response to the initial question from the user;
generate, using the processor of a machine, at least one refined question using algorithmic machine learning trained with sample training data to discover the user's affinity on the variety of topics based on the accessed user account information and the received response from the user to the initial question;
present a refined question on one or more of the tiles on the touchscreen display surface;
receive a response to the refined question from the user;
determine items to recommend for sale based on the received response to the refined question from the user;
display images of the items recommended for sale on at least some of the dynamically changing tiles; and
continue to generate and present additional refined questions until the session on the touchscreen display surface has ended.

17. The online shopping system of claim 16, wherein the instructions to present the initial question on one or more tiles on the touchscreen display surface based on the environment further comprises instructions that cause the system to:
display a question related to a travel destination of the user and
wherein the instructions to receive, the response to the initial question from the user further comprises instructions that cause the system to:
display a map having a plurality of travel destinations for the user to select from;
and receive a selection, from the user, of one of the displayed plurality of travel destinations to indicate the travel destination of the user.

18. The online shopping system of claim 17, wherein the instructions to update the displayed images of the items recommended for sale on at least some of the dynamically changing tiles represents travel destination related items.

19. The online shopping system of claim 16, wherein the environment in which the digital storefront is located is one of an airport, train station, subway station or other mass transit system station, and wherein the environment is at a starting travel destination of the user and a second environment is at a final travel destination of the user.

20. The online shopping system of claim 19, further comprising instructions to cause the system to:
receive a request, from the user, to add one or more items to a digital storefront shopping cart associated with the application;
receive a request, from the user, to checkout one or more items in the digital storefront shopping cart associated with the shopping application;
prompt the user to select a delivery option, including delivery upon arrival at the final travel destination.

21. The online shopping system of claim 19, further comprising instructions to cause the system to:
receive payment information from the user to complete payment of the one or more items in the digital storefront shopping cart associated with the shopping application; and
send instructions to a valet delivery service for delivery upon arrival at the final destination within the second environment.

22. The online shopping system of claim 19, wherein the instructions to display images of the items recommended for sale on the dynamically changing tiles further comprises instructions to cause the system to display at least one tile having images of the items recommended for sale from a physical store located within the second environment at the final travel destination.

23. The online shopping system of claim 16, wherein the instructions to receive, by the shopping application associated with the digital storefront, check-in information from a user to initiate the session on one of the multiple touchscreen display surfaces further comprises instructions to cause the system to:
send a check-in request to the user device to invite the user to check-in to the digital storefront via the user device; and
receive, from the user, a request to check-in to the digital storefront.

24. The online shopping system of claim 16, wherein the instructions to receive, by the application associated with the digital storefront having multiple touchscreen display surfaces located in the environment, check-in information from the user to initiate the session on one of the multiple touchscreen display surfaces further comprises instructions to cause the system to:
display a check-in request to the user via one of the digital storefront touchscreen displays; and
receive, from the user, a request to check-in to the digital storefront.

25. The online shopping system of claim 16, further comprising instructions to cause the system to:
receive a request, from the user, to add one or more items to a digital storefront shopping cart associated with the shopping application;

receive a request, from the user, to process payment for the one or more items in the digital storefront shopping cart associated with the shopping application;
transfer the one or more items added to the digital storefront shopping cart associated with the shopping application to an shopping application running on the user device; and
prompt the user to select an available payment option to process payment using the user device.

26. The online shopping system of claim 16, further comprising instructions to cause the system to:
receive a request, from the user, to add one or more items to a digital storefront shopping cart associated with the shopping application;
receive a request, from the user, to transfer the one or more items added to the digital storefront shopping cart associated with the shopping application to a shopping cart associated with a shopping application running on the user device; and
receive a request, from the user, to add one or more additional items to the shopping cart associated with the shopping application running on the user device.

27. The online shopping system of claim 16,
wherein the digital storefront is associated with a beacon device;
wherein the instructions to receive, by the shopping application associated with the digital storefront having multiple touchscreen display surfaces located in the environment, check-in information from the user to initiate the session on one of the multiple touchscreen display surfaces further comprises instructions to cause the system to receive an automatic check-in, from a beacon enabled user device, based on geographical proximity of the beacon enabled user device within a communication zone of the beacon device associated with the digital storefront; and
further comprises instructions to cause the system to receive an automatic check-out, from the beacon enabled user device, based on geographical proximity of the beacon enabled user device moving outside the communication zone of the beacon device associated with the digital storefront.

28. The method of claim 16, wherein the instructions to receive, by the shopping application associated with the digital storefront having multiple touchscreen display surfaces located in the environment, check-in information from the user to initiate the session on one of the multiple touchscreen display surfaces further comprises instructions to cause the system to:
receive a request, from the user device, to check-in the user using a first location specific sequence;
check-in the user to a first location corresponding to the first location specific sequence, wherein the first location is a physical store located within the environment;
receive tracking information about the user, the tracking information including information of one or more recent check-ins to the first location or nearby locations and frequency of check-ins in the first location or nearby locations; and
wherein the instructions to present at least one question on one or more tiles on the touchscreen display surface further comprises instructions to cause the system to present at least one question related to the tracking information.

29. The method of claim 28, further comprising instructions to cause the system to:
receive a request, from the user device, to check-in the user using a second location specific sequence;
check-in the user to a second location corresponding to the second location specific sequence, wherein the second location is a physical store located within the environment;
receive tracking information about the user, the tracking information including information of one or more recent check-ins the second location or nearby locations and frequency of check-ins in the second location or nearby locations.

30. A system of online shopping, comprising:
a processor;
a network interface device, coupled to the processor, to communicate with a network;
a memory including instructions, when executed by the processor, causes the system to:
discover a beacon enabled device associated with a user within a communication range of a digital storefront, the digital storefront having multiple touchscreen display surfaces located in an environment where users are temporarily within close proximity to the digital storefront as the users pass or stop in front of the digital storefront, the digital storefront associated with a beacon device, at least one of the multiple touchscreen display surfaces representing a life-size display that displays a plurality of tiles, at least some of the tiles representing dynamically changing tiles;
provide, to the beacon enabled device associated with the user within the communication range, an invitation to shop at the digital storefront;
receive, by a shopping application associated with the digital storefront, check-in information from the user to initiate a session on one of the multiple touchscreen display surfaces of the digital storefront;
responsive to receiving the check-in information, access user account information and location-based user information associated with the beacon device;
generate an initial question to discover the user's affinity on a variety of topics to create a personalized shopping experience for the user on the digital storefront;
present the initial question on one or more of the tiles on the touchscreen display surface based on the environment;
receive a response to the initial question from the user;
generating, using the processor of a machine, at least one refined question using algorithmic machine learning trained with sample training data to discover the user's affinity on the variety of topics based on the accessed user account information and the received response from the user to the initial question:
present a refined question on one or more of the tiles on the touchscreen display surface;
receive a response to the refined question from the user;
determine items to recommend for sale based on at least one of the received response to the refined question from the user, and the accessed user account information and location-based user information;
display images of the items recommended for sale on at least some of the dynamically changing tiles: and
continue to generate and present additional refined questions until the session on the touchscreen display surface has ended.

31. A non-transitory machine readable medium storing instructions that, when executed by at least one processor of a machine, cause the machine to perform operations comprising:

receiving, by a server, proximity information indicating that a user device is within close proximity to a digital storefront in an environment where users are temporarily within close proximity to the digital storefront while the users pass or stop in front of the digital storefront, the server representing at least one of a local server or a remote server associated with the digital storefront, the user device is associated with a user, the digital storefront having multiple touchscreen display surfaces:

responsive to receiving the proximity information, providing display information to the user device inviting the user to check-in to a shopping application associated with the digital storefront;

receiving, by the shopping application associated with the digital storefront, check-in information to initiate a session on one of the multiple touchscreen display surfaces of the digital storefront, at least one of the multiple touchscreen display surfaces having a size that is capable of displaying tiles that are visible to a person standing in front of the digital storefront, at least some of the tiles representing dynamically changing tiles;

responsive to receiving the check-in information, accessing user account information;

generating an initial question to discover the user's affinity on a variety of topics to create a personalized shopping experience for the user on the digital storefront;

presenting the initial question on one or more of the tiles on the touchscreen display surface based on the environment;

receiving a response to the initial question from the user;

generating, using the processor of the machine, at least one refined question using algorithmic machine learning trained with sample training data to discover the user's affinity on the variety of topics based on the accessed user account information and the received response from the user to the initial question;

presenting a refined question on one or more of the tiles on the touchscreen display surface;

receiving a response to the refined question from the user;

determining items to recommend for sale based on the received response to the refined question from the user;

displaying images of the items recommended for sale on at least some of the dynamically changing tiles; and continuing to generate and present additional refined questions until the session on the touchscreen display surface has ended.

\* \* \* \* \*